(12) United States Patent
Jabara et al.

(10) Patent No.: US 9,855,500 B2
(45) Date of Patent: *Jan. 2, 2018

(54) SYSTEM AND METHOD FOR GAME PLAY IN A DYNAMIC COMMUNICATION NETWORK

(71) Applicant: Mobilitie, LLC, Newport Beach, CA (US)

(72) Inventors: Gary B. Jabara, Newport Beach, CA (US); Christos Karmis, Irvine, CA (US); David Brett Simon, Agoura Hills, CA (US); Lloyd Frederick Linder, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,461

(22) Filed: May 24, 2017

(65) Prior Publication Data

US 2017/0259172 A1 Sep. 14, 2017

Related U.S. Application Data

(63) Continuation of application No. 15/444,140, filed on Feb. 27, 2017, now Pat. No. 9,662,571, which is a
(Continued)

(51) Int. Cl.
*A63F 9/24* (2006.01)
*A63F 13/327* (2014.01)
(Continued)

(52) U.S. Cl.
CPC .......... *A63F 13/327* (2014.09); *A63F 13/332* (2014.09); *A63F 13/34* (2014.09)

(58) Field of Classification Search
CPC ....... A63F 13/327; A63F 13/332; A63F 13/34
See application file for complete search history.

(56) References Cited

U.S. PATENT DOCUMENTS 5,618,045 A 4/1997 Kagan
5,640,384 A * 6/1997 Du .......................... H04L 12/42
370/221
(Continued)

FOREIGN PATENT DOCUMENTS

JP 2009-236934 A 10/2009
JP 2010-152772 A 7/2010
(Continued)

OTHER PUBLICATIONS

International Search Report dated May 27, 2013, in International Patent Application No. PCT/US2013/024485, filed Feb. 1, 2013, 14 pages.

*Primary Examiner* — Matthew D. Hoel
(74) *Attorney, Agent, or Firm* — Davis Wright Tremaine LLP; Michael J. Donohue

(57) ABSTRACT

A short-range wireless communication network may be established by direct communication between two or more wireless communication devices and/or communication via an access point to permit game play between a plurality of devices. A conventional cellular telephone includes an integrated short-range transceiver. The short-range transceivers of multiple wireless communication devices can be coupled together to dynamically form a short-range communication network without utilizing any wireless communication network supported by a Public Land Mobile Network (PLMN). Data is disseminated between the wireless communication devices using a data message synchronization process. Messages may also be carried from one wireless network to another as the communication devices are carried by individuals.

21 Claims, 12 Drawing Sheets

Related U.S. Application Data continuation of application No. 13/363,696, filed on Feb. 1, 2012, now Pat. No. 9,586,139, which is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
 *A63F 13/34* (2014.01)
 *A63F 13/332* (2014.01)

(56) References Cited

U.S. PATENT DOCUMENTS

| | | | | |
|---|---|---|---|---|
| 5,702,305 A * | 12/1997 | Norman | A63F 9/24 | 273/237 |
| 5,738,583 A * | 4/1998 | Comas | A63F 13/12 | 463/40 |
| 5,797,085 A * | 8/1998 | Beuk | G08C 19/28 | 370/328 |
| 5,974,236 A * | 10/1999 | Sherman | H04W 40/125 | 370/255 |
| 6,050,898 A * | 4/2000 | Vange | A63F 13/12 | 463/40 |
| 6,111,541 A * | 8/2000 | Karmel | G01C 21/30 | 342/357.4 |
| 6,149,520 A * | 11/2000 | Takatsuka | A63F 13/10 | 273/108.1 |
| 6,287,200 B1 | 9/2001 | Sharma | | |
| 6,524,189 B1 | 2/2003 | Rautila | | |
| 6,585,597 B2 * | 7/2003 | Finn | A63F 13/12 | 463/39 |
| 6,674,995 B1 | 1/2004 | Meyers | | |
| 7,006,984 B2 * | 2/2006 | Meyers | A63F 13/12 | 463/40 |
| 7,244,181 B2 * | 7/2007 | Wang | A63F 13/12 | 463/42 |
| 7,588,498 B2 * | 9/2009 | Iizuka | A63F 13/06 | 463/43 |
| 7,653,394 B2 | 1/2010 | McMillin | | |
| 7,970,351 B2 | 6/2011 | Jabara | | |
| 8,038,532 B2 | 10/2011 | Neervoort | | |
| 8,190,119 B2 | 5/2012 | Jabara | | |
| 8,628,420 B2 * | 1/2014 | Chhabra | H04W 4/02 | 463/1 |
| 8,995,923 B2 | 3/2015 | Jabara | | |
| 9,077,564 B2 | 7/2015 | Jabara | | |
| 9,586,139 B2 | 3/2017 | Jabara | | |
| 9,662,571 B1 | 5/2017 | Jabara | | |
| 2002/0006825 A1 * | 1/2002 | Suzuki | A63F 13/12 | 463/40 |
| 2003/0144045 A1 * | 7/2003 | Fujita | A63F 13/005 | 463/1 |
| 2003/0171146 A1 * | 9/2003 | Mayer | A63F 13/10 | 463/37 |
| 2004/0063498 A1 * | 4/2004 | Oakes | A63F 13/12 | 463/42 |
| 2004/0102249 A1 * | 5/2004 | Meyers | A63F 13/12 | 463/42 |
| 2005/0197188 A1 * | 9/2005 | Iizuka | A63F 13/06 | 463/36 |
| 2006/0166740 A1 * | 7/2006 | Sufuentes | A63F 13/12 | 463/40 |
| 2007/0093294 A1 * | 4/2007 | Serafat | A63F 13/12 | 463/39 |
| 2007/0265067 A1 | 11/2007 | Jiao | | |
| 2007/0281791 A1 * | 12/2007 | Ichikawa | A63F 13/10 | 463/42 |
| 2008/0102958 A1 * | 5/2008 | Kitamura | A63F 13/12 | 463/42 |
| 2008/0119269 A1 * | 5/2008 | Nonaka | A63F 13/06 | 463/32 |
| 2010/0248804 A1 * | 9/2010 | Matsumaru | A63F 13/10 | 463/4 |
| 2011/0207532 A1 * | 8/2011 | Terada | A63F 13/5258 | 463/31 |
| 2012/0142422 A1 | 6/2012 | Mori | | |

FOREIGN PATENT DOCUMENTS

| | | |
|---|---|---|
| KR | 10-2004-0047346 A | 6/2004 |
| KR | 10-2011-0105195 A | 9/2011 |

\* cited by examiner

SYSTEM AND METHOD FOR GAME PLAY IN A DYNAMIC COMMUNICATION NETWORK

CROSS REFERENCE OF THE RELATED APPLICATIONS

This application is a continuation of U.S. patent application Ser. No. 15/444,140 filed Feb. 27, 2017, which is a continuation of U.S. patent application Ser. No. 13/363,696 filed Feb. 1, 2012, now U.S. Pat. No. 9,586,139, which is a continuation-in-part of U.S. patent application Ser. No. 13/093,998 filed on Apr. 26, 2011, now U.S. Pat. No. 8,995,923, which is a continuation-in-part of U.S. patent application Ser. No. 12/958,296 filed on Dec. 1, 2010, now U.S. Pat. No. 9,077,564, which is a continuation-in-part of U.S. patent application Ser. No. 12/616,958 filed on Nov. 12, 2009, now U.S. Pat. No. 8,190,119, which is a continuation-in-part of U.S. patent application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

Field of the Invention

The present invention is directed generally to wireless communication devices and, more particularly, to a system and method of network management to permit the dynamic formation of short-range communication networks using direct communication between wireless communication devices.

Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

DETAILED DESCRIPTION OF THE INVENTION

The system described herein extends the normal operational features of conventional wireless communication devices. As described above, the conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
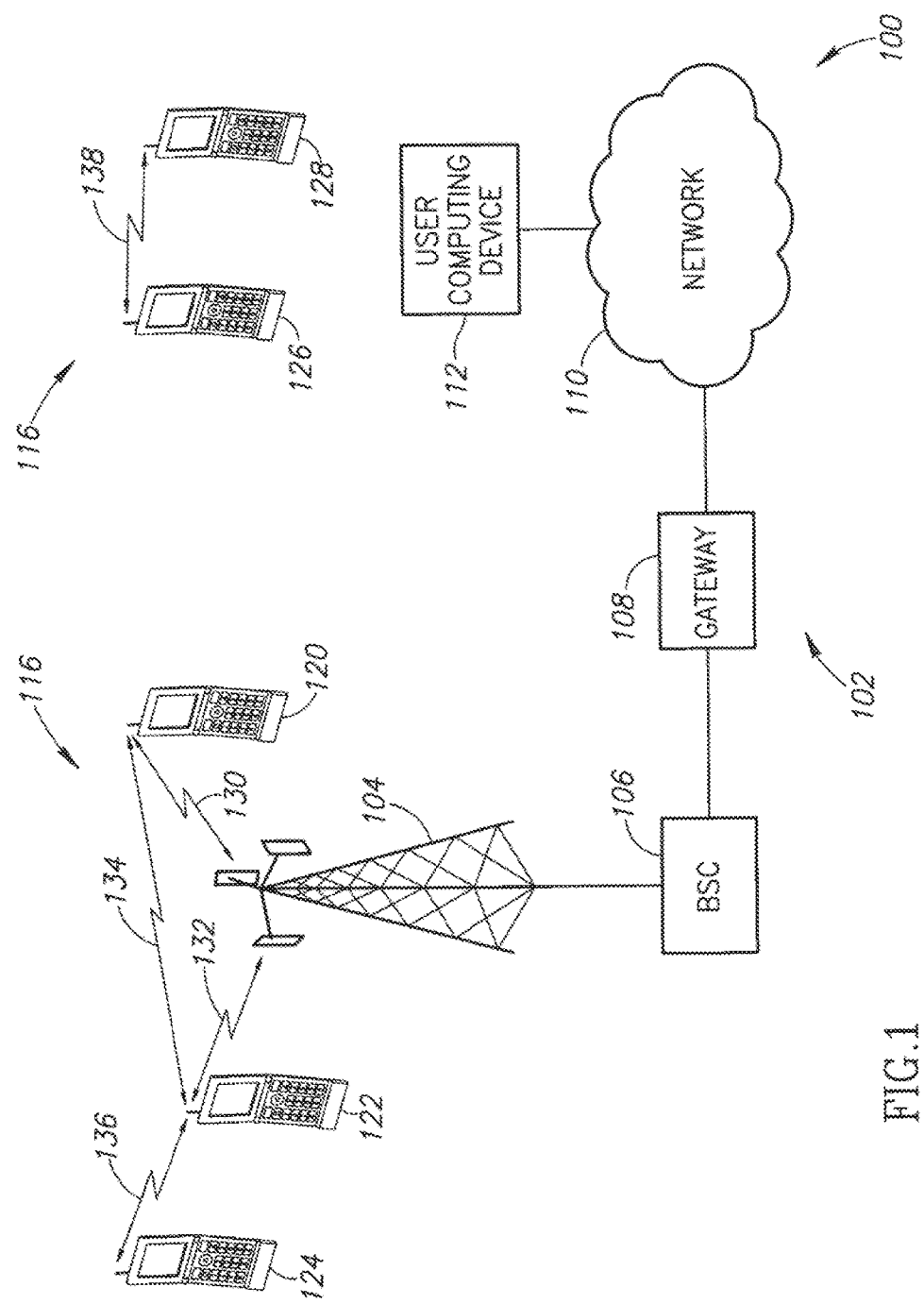
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional wireless communication network 102, sometimes referred to as a public land mobile network (PLMN), includes a base station 104. Those skilled in the art will appreciate that the typical wireless communication network 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104 or other base stations (not shown) in the wireless communication network 102. Those skilled in the art will appreciate that the wireless communication network 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104 or other base station (not shown). Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices. This short-range communication is accomplished without reliance on the wireless communication network 102. Indeed, as will be described in greater detail below, the short-range transceivers in the mobile communication devices 120-128 permit the dynamic formation of a short-range communication network 116 that does not rely on the wireless communication network 102 provided by any wireless service provider. Thus, wireless communication devices can rely on the conventional wireless communication network 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the wireless communication network 102. However, the wireless communication device 124 can communicate directly with the wireless communication device 122 via a short-range wireless communication link 136. Also illustrated in FIG. 1 are the wireless communication devices 126-128. Although neither of these devices is in communication with the wireless communication network 102, the two devices are in direct communication with each other via a short-range wireless communication link 138. Thus, jump-enabled wireless communication devices must be in proximity with each other, but need not be in communication with the wireless communication network 102 or even in an area of wireless coverage provided by the wireless communication network.

The dynamic formation of one or more short-range networks 116 allows communication between the wireless communications devices 120-128 independent of the wireless communication network 102 even if the wireless communication network 102 is present and operational. The short-range communication network 116 advantageously allows communication in settings where the wireless communication network 102 is not present or in a situation where the wireless communication network is unavailable. For example, the wireless communication network 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled wireless communication devices move throughout a geographic location.

Figure 2:
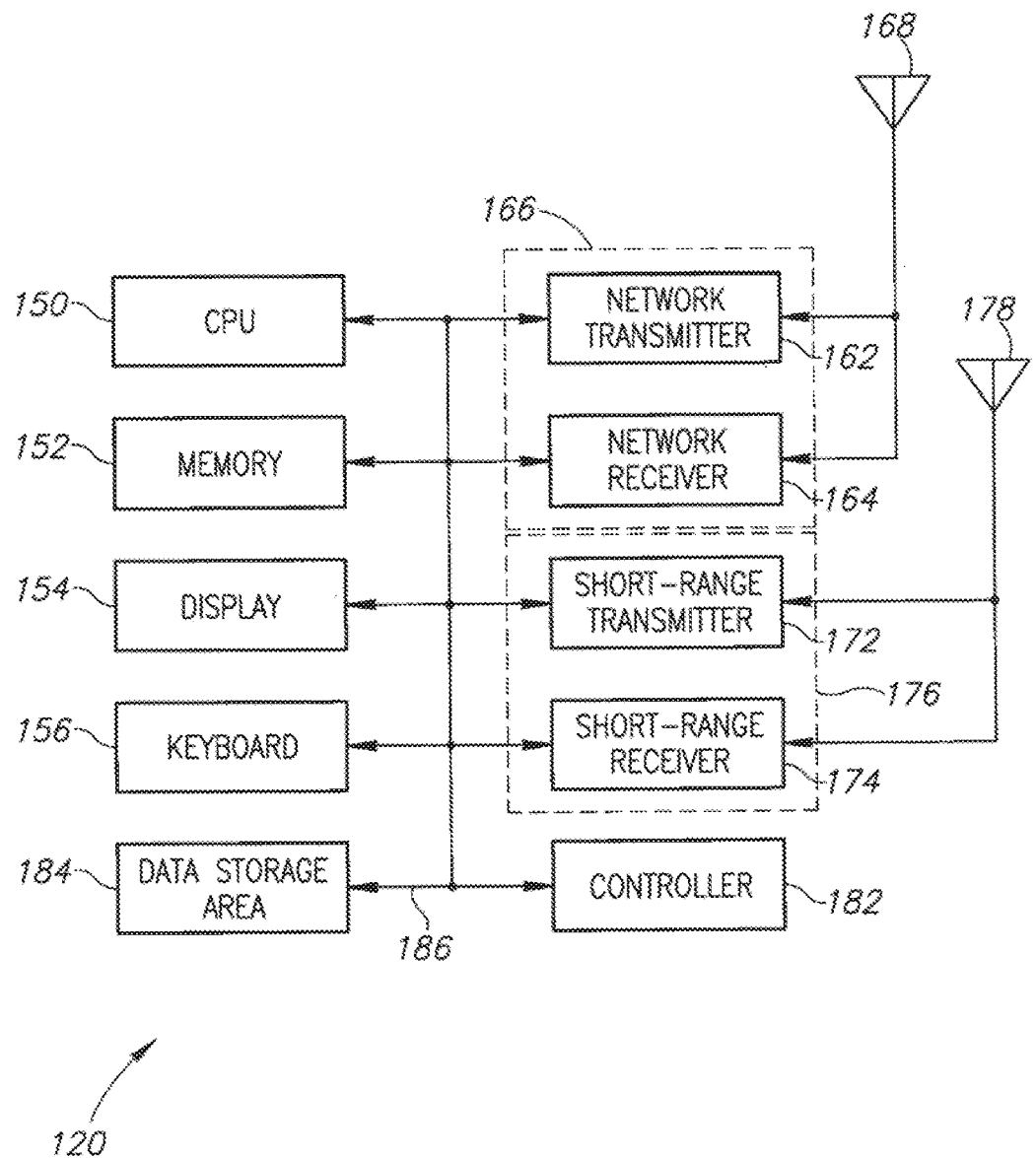
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104

(see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, COMA, WCDMA, GSM, UMTS, 3G, 4G, WiMAX, LTE, or the like. Operation of the network transceiver 166 and the antenna 168 for communication with the wireless communication network 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between wireless communication devices that become part of the short-range communication network 116. The data storage 184 contains messaging data that will be exchanged between wireless communication devices in the short-range communication network 116. The data storage area 184 may be implemented as any convenient data structure. As will be described in greater detail below, the data storage area contains data (e.g., messages, personal profile information of the user and user contacts, a geographical location tag for each contact, and the like) that will be exchanged between wireless communication devices. The data may be stored as a simple list, part of a database, or any other convenient data storage structure. The data storage area 184 also stores a list of other nearby wireless communication devices that form part of the short-range wireless communication network 116.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134).

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-128 all include WiFi capability, short-range communication networks 116 may be formed even though the wireless communication devices may be designed to operate with incompatible wireless communication networks 102. For example, the wireless communication device 122 may be configured for operation with a GSM implementation of the wireless communication network 102. The wireless communication device 124 may be configured for operation with a CDMA implementation of a wireless communication network 102. Even though the wireless communication devices 122-124 are incompatible with respect to the respective wireless communication networks 102, the wireless communication devices 122-124 may still communicate directly with each other via the short-range communication network 116. Thus, the wireless communication devices 120-128 may operate compatibly to form the short-range communication networks 116 even though the network transceivers 166 (see FIG. 2) may operate with different incompatible wireless communication networks 102.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,988 filed on Apr. 26, 2011, the entire disclosures and content of which are hereby incorporated by reference in their entirety.

The jump-enabled wireless communication device 120 also has numerous web-enabled applications. For example, an individual user may set up a JUMMMP webpage 202 with information regarding that individual. In this aspect, the jump webpage 202 may be similar to individual webpages or websites with any other conventional social network. The JUMMMP web page 202 may be accessed via the network 110 from the user computing device 112 (see FIG. 1). Alternatively, the jump website may be accessed by any web-enabled wireless communication device. For example, in FIG. 1, a non-network wireless communication link 134 has been established between the wireless communication devices 120 and 122. Some data can be exchanged directly between devices.

The data storage area 184 in each wireless device can be configured to contain profile data for that user as well as preference data. When two wireless devices make contact, they can exchange profile information to determine whether the users of the devices may be socially compatible or have sufficient common interests that they should meet. The profile data can include name, age, sex, height, weight, contact information (e.g., telephone number, email address, web link, etc.), background information (e.g., birthplace), education information (e.g., alma mater, degree(s), etc.), hobbies, sports, favorite sports teams, and the like. The user can add as much or as little as they desire. They can also determine different levels of information sharing. For example, the user can provide only basic information at the outset and more information if there is a match.

The preference data in the data storage area 184 may contain data indicating the type of person the user may wish to meet. For example, a male of a certain age range may wish to meet a female of a certain age range that has similar hobbies, educational background, or sports interests. When two wireless communication devices (e.g., the wireless communication devices 120 and 122) establish a communication link (e.g., the non-network wireless communication link 134), the devices exchange the profile data, which is analyzed by the controller 182 (see FIG. 2) with respect to the user preference data. If a match occurs between the received profile data and the preference data stored in the profile storage 184, a contact indicator is generated to advise the users that there is a nearby individual that they may want to meet.

Following an initial contact, the user of a wireless device (e.g., the wireless device 120) may use the web-browsing capability of the wireless communication device to access an individual JUMMMP web page 202 (see FIG. 3) for the individual with whom contact has just been made. This embodiment is illustrated in FIG. 1 where the wireless communication device 120 communicates with the base station 104 via the network wireless communication link 130. The wireless communication device 120 may use conventional web-browsing techniques to request access to a JUMMMP website 200 via the network 110. Further, the wireless communication device 120 may request access to the individual JUMMMP webpage 202 of the new contact (e.g., the user of the wireless communication device 122). In an exemplary embodiment, initial data exchange between the wireless communication devices 120-122 via the non-network wireless communication link 134 may include a link to the JUMMMP webpage 202. That is, if a match is determined by the controllers 182 in the respective wireless communication devices 120 and 122, the wireless communication device 120 may use the transmitted JUMMMP web page link to easily access the JUMMMP webpage 202 and get more information about the new contact. Thus, the initial social contact made via the non-network wireless communication link 134 can readily provide additional information, in the form of a web link to allow the users of the wireless communication devices to gain further information via the wireless communication network 102.

Figure 3:
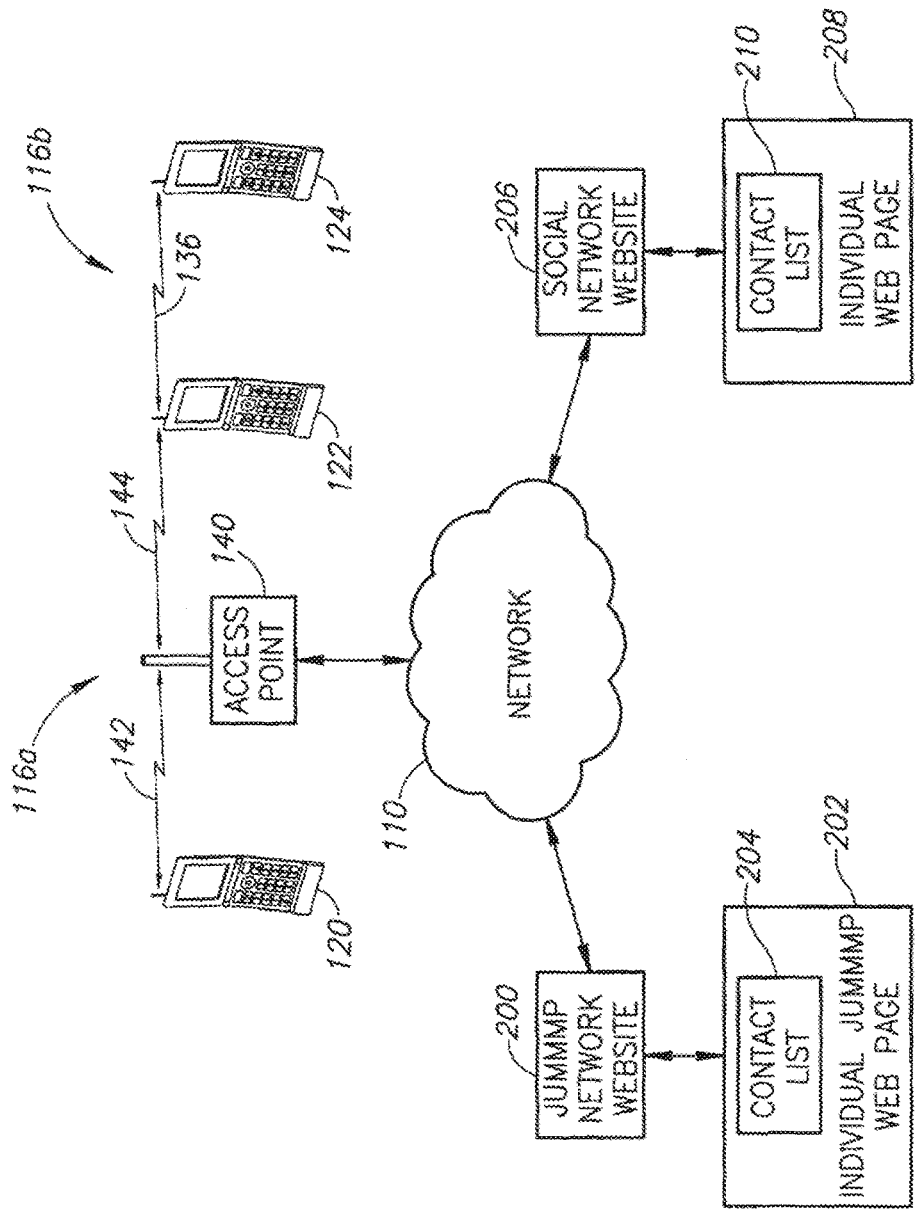
FIG. 3 illustrates an embodiment of the system of FIG. 1 using an access point as part of a network.

In yet another aspect, the system 100 can utilize information from existing social networks. In a typical social network website 206, each individual web page 208 has a list of "friends" or "contacts" 210 that are maintained for that individual. In one embodiment, a jump-enabled wireless communication device (e.g., the wireless communication device 120) may download the contact list for storage as part of the profile storage 184. This is also illustrated in FIG. 3 where the individual JUMMMP web page 202 includes a contact list 204 that contains a list of all individuals that the owner of the individual web page 202 has identified as part of that individual's social network. In this aspect, the contact list 204 may be downloaded via the wireless communication network 102 to the wireless communication device 120 for storage in the profile storage 184.

In operation, the wireless communication device 120 searches for contacts in the manner described above. When a non-network wireless communication link (e.g., the non-network wireless communication link 134) is established, the profile data is exchanged between the wireless communication devices 120 and 122, in the manner described above. If the user of the wireless communication device 122 is already on the contact list 204 (now downloaded and stored in the profile storage 184), the wireless communication device 120 may immediately generate a contact notification to the user of the wireless communication device 120. In this embodiment, the controller 184 need not do a detailed comparison between the profile data received from the wireless communication device 122 and the stored preference data stored in the profile storage 184. Rather, the mere match between the user name of the wireless communication device 122 in the received profile data provides a match with the contact list 204 and the contact notification is generated. In another aspect of this embodiment, the wireless communication device 120 may transmit a web link to the individual web page 202 to enable the user of the wireless communication device 122 to gain additional information about the individual user of the wireless communication device 120. This may be in place of, or in addition to, an individual jump web page link, described above. Thus, system 100 allows seamless integration with existing social network websites as well as the JUMMMP network website 200.

The examples provided above extract data from the JUMMMP network website 200 or the social network website 206 and provide it to the wireless communication devices 120 and/or 122. However, the reverse process may also be implemented by the system 100. Following the determination that a match exists between the wireless communication devices 120-122, data, such as the profile data may be automatically extracted from the wireless communication device (e.g., the wireless communication device 120) and provided to the JUMMMP network website 200 and/or the social network website 206 for the user of the wireless communication device 122. For example, the user profile data from the wireless communication device 120 may be added to the contact list 204 on the JUMMMP network web page 202 of the user of the wireless communication device 122. Other profile information or other user-authorized information may also be used to populate the individual JUMMMP web page 202 and/or the individual web page 208 of the social network. Thus, data stored within the wireless communication device may be extracted and used to populate data bases or other data storage structures.

In the embodiment described above, when a match notification is generated, the profile data transmitted by one wireless communication device (e.g. the wireless communication device 120 in FIG. 1) may be automatically extracted and sent to the individual JUMMMP web page 202 (see FIG. 3) for the user of the wireless communication device 122. Furthermore, any additional information authorized by the user of the wireless communication device 120 may be extracted upon generation of a match notification and sent to the individual JUMMMP web page 202 for the user of the wireless communication device 122. This may include information described above as optional profile data, such as an email address, telephone numbers, web page links, and the like. This automatic extraction process advantageously allows the user to automatically store information from contacts in the user's individual JUMMMP web page 202. At a subsequent time, the user may access his own individual JUMMMP web page 202 to retrieve the stored information and to organize or further utilize the stored information. This may be particularly advantageous in a situation where the user of the wireless communication device 120 makes a number of contacts in a short period of time. While the wireless communication device 120 may store the profile data from multiple contacts, the automatic extraction and storage process described herein allows the data to automatically be extracted and forwarded to the users individual JUMMMP web page 202 for future use. Those skilled in the art will appreciate that the automatic data extraction and storage may also be performed on the individual web page 208 (see FIG. 4) associated with the social network website 206.

As previously described, information may also be extracted from the JUMMMP network website 200 or the social network website 206 and provided to the wireless communication devices once it has been determined that a match exists. Alternatively, further authorization may be required prior to the retrieval of data from the JUMMMP network website 200 or the social network website 206. As also discussed above, data from the wireless communication devices 120-122 may be extracted and used to provide information to the JUMMMP network website 200 and/or the social network website 206. Once a match has been established, data, such as user profile data, may be extracted from the wireless communication devices 120-122 and provided to the JUMMMP network website 200 and/or the social network website 206. This data is automatically extracted from the wireless communication device (e.g., the wireless communication device 122 in FIG. 6) and stored in the individual JUMMMP web page 202 associated with the user of the wireless communication device 120. Alternatively, further authorization beyond a match determination may also be required. The extracted data may transmitted to the individual JUMMMP web page 202 vie the PLMN 102 (see FIG. 1) or via the access point 140 (see FIG. 3). This automatic process advantageously allows the user to collect profile data from a number of contacts and automatically have the information extracted and used to populate a data storage area on the individual's web page. In one embodiment, the data may be extracted from known data fields. In this situation, the data may be used to automatically populate data storage locations or cells in a database, spreadsheet, data table, or any other convenient data structure. The precise form of the data structure is not critical to satisfactory implementation of the data extraction and storage process.

Thus, the system 100 may automatically extract data and populate a data structure in an individual's web page for future use. While the above process has been described with respect to the embodiment of FIG. 3, those skilled in the art will appreciate its applicability to other system embodiments illustrated in other figures, including an embodiment where the extracted profile data is transmitted to the individual JUMMMP web page 202 (or the individual social network web page 208) via the PLMN 102, the access point 140 or via another wireless communication device that forms part of the short-range communication network 116.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the wireless communication devices may be pre-programmed to utilize a common SSID, IPrange, and port to spontaneously form a short-range communication network 116 even in the absence of any hot spot.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, since there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

In yet another alternative embodiment, illustrated in FIG. 3, the jump-enabled wireless communication devices (e.g., the wireless communication devices 120-122) may communicate with an access point 140, such as a WiFi base station, WAP, wireless router, or the like. As will be described in greater detail below, a wireless communication device (e.g., one of the wireless communication devices 120-124) may function as the access point 140 to permit others of the wireless communication devices in the short range communication network 116 to access the network 110 via the wireless communication device serving as the access point. FIG. 3 illustrates a wireless communication link 142 established between the access point 140 and the wireless communication device 120. Similarly, the wireless communication device 122 establishes a wireless communication link 144 with the access point 140. Thus, a short-range communication network 116a is formed in conjunction with the access point 140.

To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the wireless communication devices 120-124, there may be one or more short-range communication networks 116 formed. In the example of FIG. 3, the wireless communication devices 120-122 are both within range of the access point 140. Therefore, the first short-range communication network 116a can be formed with the wireless communication devices 120-122 and the access point 140.

The wireless communication device 124 is within range of the wireless communication device 122, but is not within range of the access point 140. In one embodiment, the wireless communication device 124 may be become part of the short-range communication network 116a via the wireless communication device 122. In this embodiment, the wireless communication device 122 functions as a "repeater" or relay to relay information between the wireless communication device 124 and other parts of the short-range communication network 116a. In another embodiment, a second short-range communication network 116b is formed with the wireless communication devices 122-124. In this exemplary embodiment, the wireless communication device 122 is part of both short-range communication networks 116a-116b. The wireless communication device 122 may simultaneously be a member of both short-range communication networks 116a-116b or may be logically connected to both short-range communication networks 116a-116b by alternately switching between the short-range communication networks 116a-116b.

The access point 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 effectively functions as a social network website. Similarly, the JUMMMP website technology can be incorporated into existing social network websites. Thus, the two separate websites illustrated in FIG. 3 can effectively be combined into a single website.

As discussed in detail in co-pending U.S. application Ser. No. 12/616,958, filed on Nov. 12, 2009 and assigned to the assignee of the present application, the user of a jump-enabled wireless communication device (e.g., the Wireless device 120) may use the web-browsing capability of the wireless communication device to access the individual jump web page 202 for the individual with whom contact has just been made to learn more about that individual. Alternatively, the user of a jump-enabled wireless communication device (e.g., the wireless device 120) may use the web-browsing capability of the wireless communication device to access the user's own individual jump web page 202 to store information for the individual with whom contact has just been made. A contact list 204, which is typically a portion of the individual jump web page 202 is configured to store contact information. Similarly, the individual jump web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

The wireless communication devices 120-128 (see FIG. 1) generally have sufficient memory capacity to temporarily store contact information. In an exemplary embodiment, the wireless communication device (e.g., the wireless communication device 120) can temporarily store new contact information until access to the network 110 becomes available at a later time. In addition, the wireless communication device 120 can store designated contact information (e.g., "Favorites") on a more permanent basis. Long-term storage of contact information requires access to the network 110. In the embodiment of FIG. 1, access to the network 110 may be provided via the base station 104 in a conventional manner. The wireless communication device 122 may access the network 110 by communicating directly with the base station 104. In the embodiment of FIG. 3, access to the network 110 may be provided via the access point 140, as described above. For example, the wireless communication device 122 in FIG. 1 may access the network 110 by communicating directly with the access point 140 via the short-range communication link 144. Alternatively, the wireless communication device 122 can access the network 110 and the JUMMMP network website 200 via the wireless communication link 132 to the base station 104. Network access via the gateway 108 is well known in the art and need not be described in greater detail herein.

In an alternative embodiment, access to the network 110 may be provided via another jump-enabled wireless communication device. For example, in FIG. 1, the wireless communication device 122 can communicate with the base station 104 via the wireless communication link 132 while the wireless communication device 124 cannot communicate directly with the base station. However, the wireless communication device 124 is in proximity with the wireless communication device 122 and can communicate with the wireless communication device 122 via the wireless communication link 136 as part of the short-range communication network 116. In this embodiment, the wireless communication device 124 can use the wireless communication device 122 as a repeater or relay to allow the wireless communication device 122 to access the network 110 via the wireless communication device 122 and the base station 104.

Similarly, in the embodiment of FIG. 3, the wireless communication devices 120-122 can communicate directly with the access point 140 via the wireless communication links 142-144, respectively. The wireless communication devices 120-122 can also communicate with each other via the access point 140 thus forming the short-range communication network 116a. As seen in FIG. 3, the wireless communication device 124 cannot communicate directly with the access, point 140. However, the wireless communication device 124 is in proximity with the wireless communication device 122 and can communicate with the network 110 via the wireless communication device 122 and the access point 140.

Figure 4:
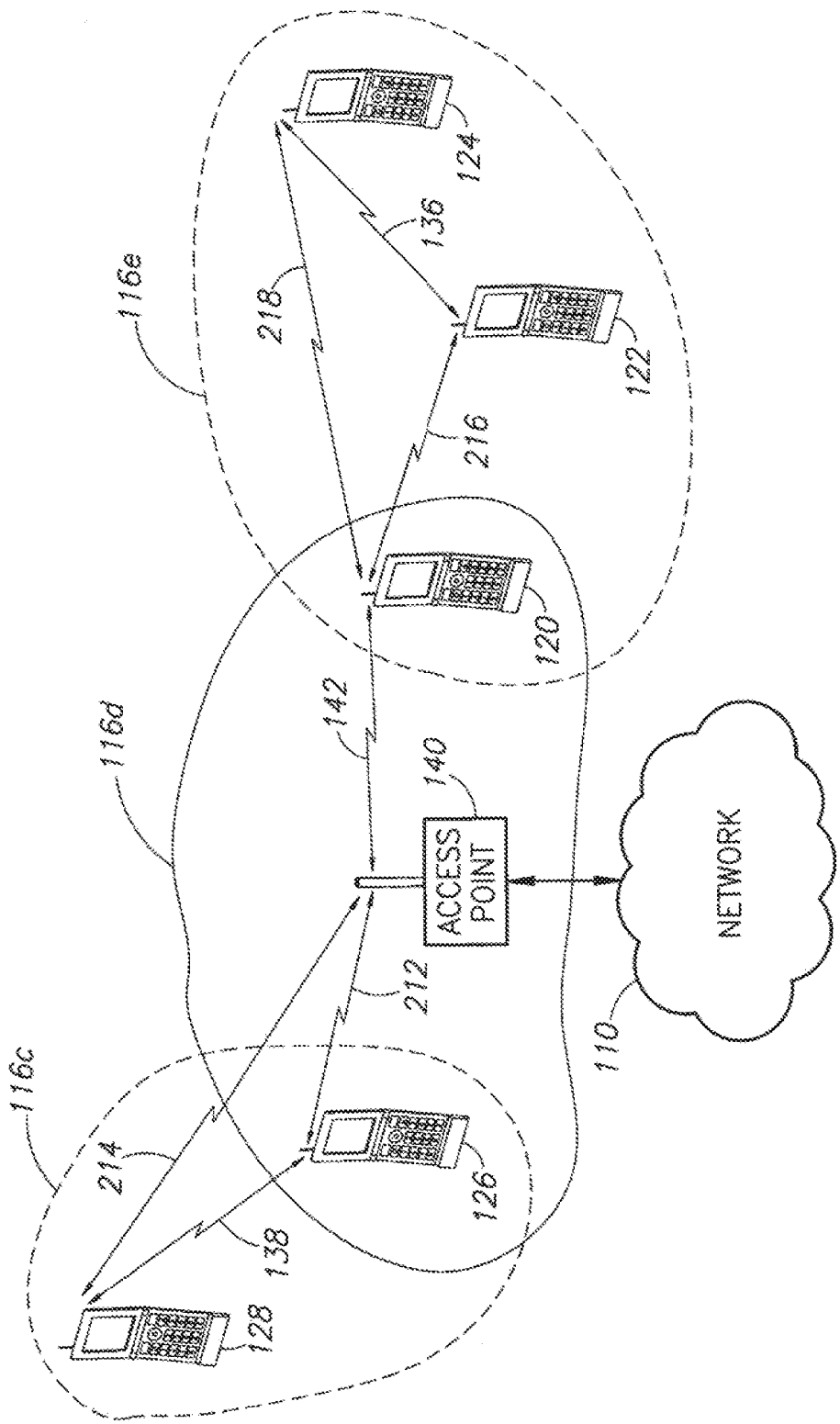
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the wireless communication devices 120-124 and a second short-range communication network 116 formed between the wireless communication devices 126-128. FIG. 4 illustrates the dynamic nature of the wireless communication networks 116. For example, if the wireless communication device 128 is initially within range of the wireless communication device 126, but out of range of the access point 140, the wireless communication devices 126-128 may form a short-range communication network 116c using the short-range communication link 138. If the wireless communication device 126 comes within range of the access point 140, a wireless communication link 212 is formed. In that event, the wireless communication device 126 may become part of a short-range communication network 116d formed between the access point 140 and the wireless communication devices 120 and 126. At this particular moment in time, the mobile communication device 126 may be part of both the short-range communication network 116c and the short-range communication network 116d. As discussed above, the wireless communication device 126 may actually be part of both the short-range communication networks 116c-116d or may logically be connected to both the short-range wireless communication networks by switching back and forth between the short-range communication networks 116c-116d. The logical switching between the short-range communication networks 116c-116d is transparent to the user. Other examples of the short-range communication network 116 are described below in which no access point 140 is present.

Alternatively, the wireless communication device 128 may become part of the short-range communication network 116d using the wireless communication device 126 as a relay to the access point 140. If, at a later time, the wireless communication device 128 comes within range of the access point 140, a wireless communication link 214 is formed therebetween. At that point in time, the short-range communication network 116c effectively ceases to exist since the wireless communication devices 126-128 are now part of the short-range communication network 116d.

The wireless communication device 120 may be part of the short-range communication network 116d by virtue of the short-range communication link 142 coupling the wireless communication device 120 to the access point 140. If the wireless communication device 120 comes within range of the wireless communication devices 122-124, wireless communication links 216-218 will be formed to couple the wireless communication devices 120-124 and thereby dynamically form a short-range communication network 116e. At this point in time, the wireless communication device 120 may simultaneously be part of the short-range communication network 116d and the short-range communication network 116e. Alternatively, the wireless communication devices 122-124 may become part of the short-range communication network 116d via the wireless communication device 120.

If the wireless communication device 120 subsequently moves out of range of the access point 140, the wireless communication link 142 is broken. Therefore, there will no longer be an overlap between the short-range communication networks 116d-116e. The wireless communication device 120 would remain part of the short-range communication network 116e so long as it remains within range of the wireless communication device 122, the wireless communication device 124, or both. Thus, those skilled in the art will appreciate that short-range communication networks are dynamically formed, modified, and dissolved as the wireless communication devices move in and out of range with each other and central points, such as the access point 140. Furthermore, if the wireless communication device 120 comes back into range of the access point 140, the wireless communication link 142 can be reestablished. When this happens, all prior communications from the short-range communication network 116e will be transferred to the short-range communication networks 116d and 116c (and vice-versa) through the re-echoing function described above. That is, the various wireless communication devices will resynchronize the data in the date storage area 184 (see FIG. 2). Those skilled in the art will also appreciate that the short-range communication networks 116 may be formed, modified, and dissolved without the presence of the access point 140.

FIG. 4 illustrates the wireless communication device 120 as a key component in the short-range communication network 116e because it connects the wireless communication devices 122-124 to the access point 140. If the wireless communication device 120 suddenly moved out of range of the access point and/or the wireless communication devices 122-124 that connection may be broken. Similarly, if the user of the wireless communication device 120 suddenly turned off the device, the link between the short-range communication network 116e and the access point 140 would disappear. The wireless communication devices 122-124 still communicate with each other via the wireless communication link 136 and will still search for other wireless communication devices with which to connect. In addition, either of the wireless communication devices 122-124 will attempt to find the access point 140 or a hot spot from which either of the wireless communication devices may access the network 110.

FIG. 4 illustrates a sparse network with only five wireless communication devices. However, those skilled in the art can appreciate that there may be a very large number of wireless communication devices in proximity with each other. For example, if FIG. 4 is illustrative of a large shopping mall, there may be hundreds of wireless communication devices within the mall. Thus, the short-range communication networks 116 may be large and extensive. There may be a large number of wireless communication devices that are simultaneously present in two or more short-range communication networks 116. In addition, many wireless communication devices would provide overlapping coverage with multiple short-range communication networks 116. In this scenario, the entire mall and surrounding parking area could be effectively covered by a mesh network comprising dozens or hundreds of short-range communication networks 116. Thus, in the situation illustrated in FIG. 4 where the wireless communication device 120 is turned off or moved out of range of other wireless communication devices is less likely to cause the total isolation of the short-range communication network 116e. If the wireless communication device 120 were suddenly removed, either by powering down or by the departure from the area, many other wireless communication devices (not shown) in the same proximity would be able to replace the connectivity between the short-range communication network 116e and the access point 140.

Whenever a wireless communication device (e.g., the wireless communication device 124) comes within range of other wireless communication devices, a short-range wireless communication network (e.g., the short-range wireless communication network 116e), the wireless communication devices exchange message data with each other to thereby synchronize message data in the data storage area 184 (see FIG. 2). At the end of the synchronization process, the data storage area 184 of each wireless communication device will contain the same message data, although messages may not be in the same sequence. In the example described above, when the wireless communication device 124 comes within range of the wireless communication device 120 and/or the wireless communication device 122, the wireless communication links 136 and 218 are formed. Because the wireless communication device 124 has just joined the short-range communication network 116e, the data storage area 184 of the wireless communication device 124 will not be synchronized with the data storage area of other wireless communication devices in the short-range communication network 116e. During the synchronization process, the wireless communication device 124 transmits message data in its data storage area 184. The wireless communication devices 120 and 122 receive the message data. The controller 182 (see FIG. 2) in each wireless communication device receives the message data and merges the messages with the message data already stored within the data storage area 184 of the wireless communication devices 120 and 122, respectively. The controller 182 in each of the wireless communication devices may also eliminate duplicate messages. In this manner, each wireless communication device manages the message data within its data storage area 184.

As part of the synchronization process, the wireless communication devices 120 and 122 may also transmit the message data within their respective data storage areas 184. The wireless communication device 124 receives the messages from the wireless communication devices 120 and 122 and merges the newly received messages in the data storage area 184 of the wireless communication device 124. As described above, the controller 182 (see FIG. 2) of the wireless communication device 124 may eliminate duplicate messages within its data storage area 184. Following this synchronization process, all wireless communication devices in the short-range communication network 116e will have identical messages.

In an exemplary embodiment, the messages may be categorized as Public Messages, Group Messages, Direct Messages, and Status Messages Public Messages may be transmitted to anyone within range of the wireless communication device (e.g., the wireless communication device 120). This may include emergency messages, messages broadcast from a retailer, and the like. Group Messages are intended for a specific group or organization, such as a scout group or employees of a particular company or any formed group. Direct Messages are private messages intended for a specific individual. In addition, the wireless communication device 120 may transmit Status Messages, which can include, by way of example, a list of other wireless communication devices in the particular short-range communication network 116, a list of recent wireless communication devices in the particular short-range communication network, a list of other short-range communication networks in which the wireless communication device was recently a member, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," filed ON Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the wireless communication device with which the last synchronization was performed. This information may help maintain synchronization between wireless devices.

The message data may include, but is not limited to, text message data, audio data, video data, multimedia data, or the like. As those skilled in the art will appreciate, Public Messages may be received and processed by any wireless communication device. In contrast, Group Messages may only be processed by a member of the designated group, while a Direct Message may only be processed by the individual wireless communication device for whom the message is intended.

Synchronization may occur directly between the wireless communication devices or via the access point 140 illustrated in FIG. 4. For example, message synchronization can occur between the wireless communication device 120 and the wireless communication device 126 using the access point 140. In addition, as will be described in greater detail below, wireless communication devices can carry message data as they move from one short-range communication network to another.

In another embodiment, a retail business may broadcast Public Messages to nearby wireless communication devices. In an exemplary embodiment, the retail facility can set up a wireless access point (e.g., the wireless access point 140 in FIG. 3) to establish a short-range communication network 116. For example, a retail facility in a shopping mall can transmit advertisement messages to nearby wireless communication devices. In a typical embodiment, these would be Public Messages that are freely relayed from one wireless communication device to another and from one short-range wireless communication network 116 to another. Using this form of message distribution, an advertisement from a retail facility will soon be disseminated to all wireless users in the area. The advertisements may take the form of text messages or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the wireless communication devices in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

Figure 5:
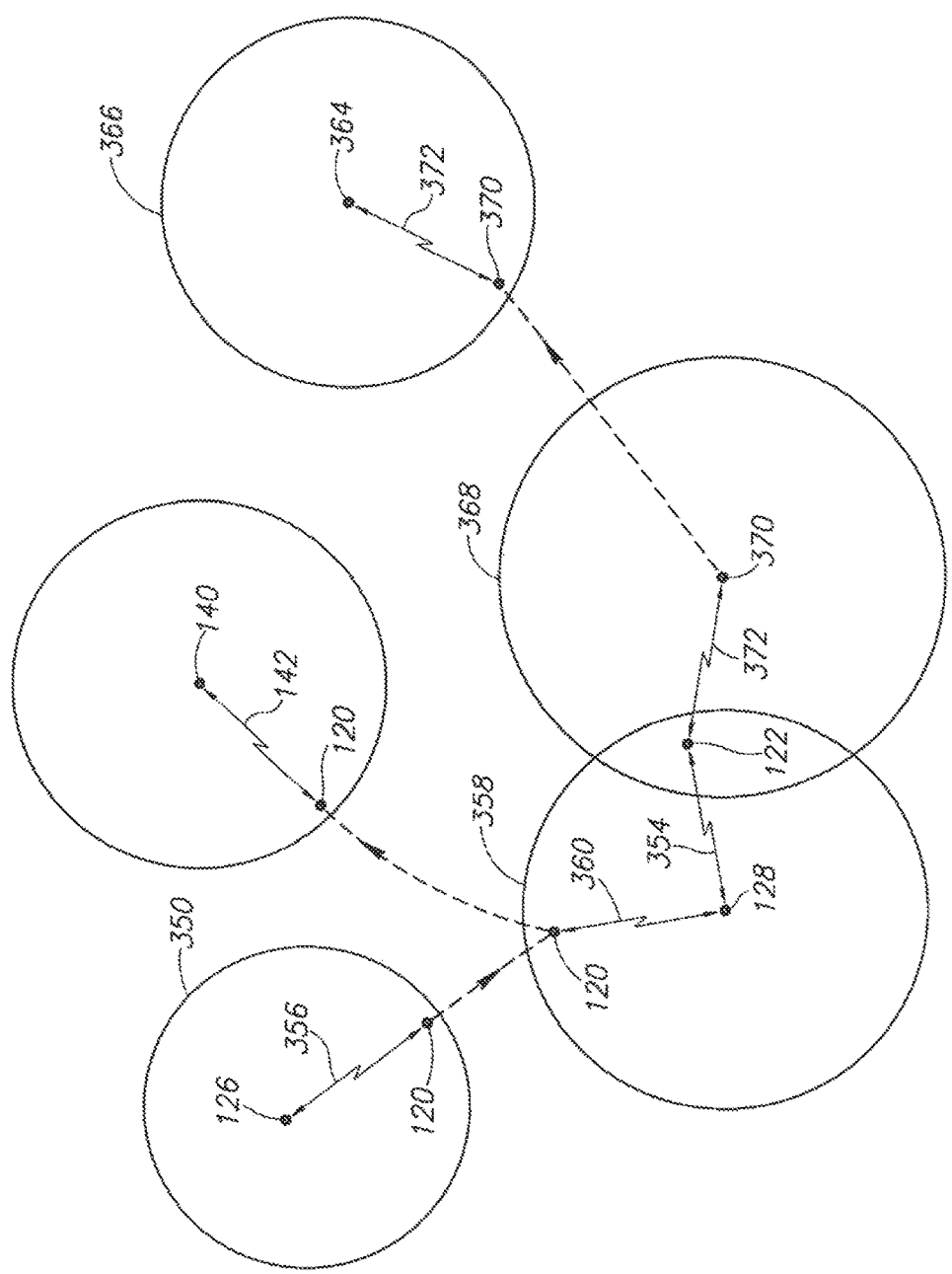
FIG. 5 illustrates the dissemination of information using an access point.

FIG. 5 illustrates the distribution of message data throughout multiple short-range communication networks 116. For the sake of simplicity, the wireless communication devices are illustrated in FIG. 5 merely as dots with associated reference numbers. Furthermore, the area of coverage of wireless communication devices may be illustrated as a circle in FIG. 5. Those skilled in the art will appreciate that the circle is a two-dimensional representation of the area of coverage of a particular wireless communication device. Those skilled in the art will appreciate that the wireless communication device transmits in three-dimensions and that the arc of coverage may be altered by natural or manmade barriers (e.g., terrain, plants, trees, walls, buildings, and the like). The area of coverage may even alter as the wireless communication device moves from one room to another within a building.

FIG. 5 illustrates a scenario in which wireless communication devices travel from one short-range communication network 116 to another and thereby distribute data stored in the data storage area 184 of the traveling wireless communication device. In FIG. 5, the wireless communication device 126 may generate a Direct Message for a wireless communication device 364 having an area of coverage 366 that does not overlap with the communication range 350 of the wireless communication device 126. In the example illustrated in FIG. 5, the Direct Message is contained within the data storage area 184 of the wireless communication device 126 possibly along with other messages. The Direct Message may have been generated by the wireless communication device 126 or may have been received by the wireless communication device 126 from another wireless communication device (not shown). The wireless communication device 126 uses the wireless communication link 356 to exchange message data with the wireless communication device 120. In the example illustrated in FIG. 5, the wireless communication device moves out of the communication range 350 and into the communication range 358 of the wireless communication device 128. In the present example, there may be a period where the wireless communication device 120 is not within range of any short-range communication network 116. However, as the wireless communication device 120 moves within the coverage range 358, it establishes the wireless communication link 360 with the wireless communication device 128 and exchanges message data therewith in the manner described above. In turn, the wireless communication device 128 exchanges data, including the Direct Message carried by the wireless communication device 120, with the wireless communication device 122 using the wireless communication link 354.

As FIG. 5 illustrates, the wireless communication device 122 is within a communication range 368 of a wireless communication device 370. The wireless communication device 122 exchanges data, including the data originally carried by the wireless communication device 120, to the wireless communication device 370 using a wireless communication link 372. In the example of FIG. 5, the wireless communication device 370 moves out of range of the wireless communication device 122 and out of the communication range 358. At some later point in time, the wireless communication device 370 moves within the communication range 366 of the wireless communication device 364, which is the intended recipient of the Direct Message originally stored in the data storage area 184 of the wireless communication device 126. At this point, the wireless communication device 370 establishes a communication link 372 with the wireless communication device 364. The wireless communication device 370 exchanges data in the data storage area 184 (see FIG. 2) with the wireless communication device 364. As previously discussed, the wireless communication device 370 is carrying the data originated by the wireless communication device 126. This is true even though the wireless communication device 370 may have been out of range of any wireless communication devices for some period of time. Following the data exchange between the wireless communication devices 370 and 364, the wireless communication device 364 now includes the data originally stored in the data storage area 184 of the wireless communication device 126. Thus, it can be appreciated that the dynamic and fluid nature of the short-range communication networks 116 allows data to be exchanged between wireless communication devices that are in range of each other and for data to be carried from one short-range communication network 116 to another.

The example illustrated in FIG. 5 shows only a single wireless communication device 120 moving from the communication range 350 to the wireless communication device 358, the single wireless communication device 370 moving from the area of coverage 368 to the area of coverage 366. However, those skilled in the art will appreciate that this scenario can be repeated by dozens of wireless communication devices. Using the example of a shopping mall, data may be originally exchanged between dozens of wireless communication devices within a single short-range communication network 116. As each of those dozens of wireless communication devices fan out, they temporarily become members of other wireless communication devices and disseminate the data stored in their respective data storage areas 184 to potentially dozens of other wireless communication devices within the new short-range communication network. This form of "viral" distribution can effectively provide a mesh network in areas where there is a large accumulation of wireless communication devices. Thus, the data from the wireless communication device 126 in the example of FIG. 5 may, in fact, be delivered to the wireless communication device 364 through a multitude of pathways.

FIG. 5 illustrates the movement of mobile communication devices from one short-range communication network 116 to another. Those skilled in the art will appreciate that the distances between short-range communication networks 116 may be considerable. Messages could be relayed from one wireless communication device to another and from short-range communication device to another. When a wireless communication device is temporarily out of range of a short-range communication network 116, that wireless device will carry the messages stored in the data storage area 184 (see FIG. 2) until it comes in contact with another short-range communication network. At that point, the message data will be transferred to other wireless communication devices in that short-range communication network 116 and each of those wireless communication devices will carry the message further until it reaches its intended recipient. Thus, a message could be carried a few feet to its intended destination or a few hundred miles to its destination.

When a large number of conventional wireless communication devices are in physical proximity, such as a sporting event or even in rush-hour traffic, a conventional service provider network (e.g., the base station 104 in FIG. 1) is often overwhelmed because many wireless communication devices are attempting to connect to the same base station. Thus, too many conventional mobile communication devices in proximity can be a debilitating situation. In contrast, the system 100 can actually take advantage of the presence of a large number of wireless communication devices because a large number of devices will facilitate the movement of messages independent of the conventional service provider network. Thus, the system 100 can facilitate rather than debilitate communication in the presence of a large number of mobile communication devices. For example, a message generated by one user in rush-hour traffic will be quickly relayed to many other wireless communication devices in the same rush-hour traffic. Thus, messages may move quickly up and down a roadway. In addition, some of the wireless communication devices will become part of short-range communication networks in other locations near the roadway. Thus, the message spreads up and down the roadway using the wireless communication devices in automobiles on the roadway and moves away from the roadway as automobiles enter and leave short-range communication networks adjacent to or near the roadway. The system 100 could move a message from, by way of example, Orange County to Los Angeles using a variety of short-range communication networks in the manner described above.

As previously discussed, messages may be categorized in several categories, such as Public Messages, Group Messages, Direct Messages, and Status Messages. In addition, a priority category may be created to disseminate emergency messages. The example of FIG. 5 illustrates one embodiment in which an emergency message may be generated by the wireless communication device 126 or received by the wireless communication device 126 from another wireless communication device (not shown). The emergency message can be disseminated to the recipient (e.g., the wireless communication device 364 in FIG. 10) in the manner described above. One distinction between an emergency message and other message types is that an emergency message will not be deleted from the data storage area of any wireless communication device until "Message Received" confirmation message is received or until some instruction is received to delete the emergency message from the data storage area 184. In this embodiment, the emergency message may be distributed in the same fashion described above. When the emergency message reaches its intended recipient (e.g., the wireless communication device 364), the recipient wireless communication device generates a "Message Received" or message receipt and transmits it back to the originator (e.g., the wireless communication device 26 or wireless communication device not shown). Because of the dynamic nature of the short-range communication networks 116, the Message Received will likely be distributed via a different pathway with a different set of wireless communication devices in different sets of short-range communication networks 116. As the Message Received is distributed, each wireless communication device uses the Message Received to delete the emergency message from the data storage area 184. If a particular wireless communication device never received the emergency message, the Message Received may be ignored. Alternatively, the Message Received message can be delivered via the access point 140 or the network 110 (see FIG. 1). For example, the wireless communication device 364 may receive the emergency message and generate the Message Received message for transmission via one or more short-range communication networks 116. Additionally, the wireless communication device 364 may send the Message Received message via the network 110. The Message Received message may be delivered to the network 110 via the access point 140 (see FIG. 3) or via another wireless communication device having network access or via a base station (e.g., the base station 104 of FIG. 1) and a gateway (e.g., the gateway 108 in FIG. 1). The Message Received receipt can be delivered to the originator of the emergency message or delivered to the individual web page 208 or individual JUMMMP web page 202 (see FIG. 3) to notify the message originator that the message has been received.

A different emergency message scenario is also illustrated in FIG. 5. In this scenario, the system 100 may use the network 110 (see FIG. 1) to further disseminate an emergency message. In FIG. 5, the wireless communication device 120, which has already migrated from the communication area 350 to the communication area 358 now migrates again and comes within range of the access point 140. As described above, the wireless communication link 142 is established between the wireless communication device 120 and the access point 140. In one embodiment, the access point 140 may be part of one or more short-range communication networks 116 and further disseminate the emergency message in a conventional manner. Alternatively, the access point 140 may be a gateway to the network 110 to permit dissemination of the emergency message via the network 110. In this embodiment, the emergency message may require additional headers to identify the recipient. Thus, the wireless access point 140 and network 110 may be used to disseminate the emergency message.

Figure 6:
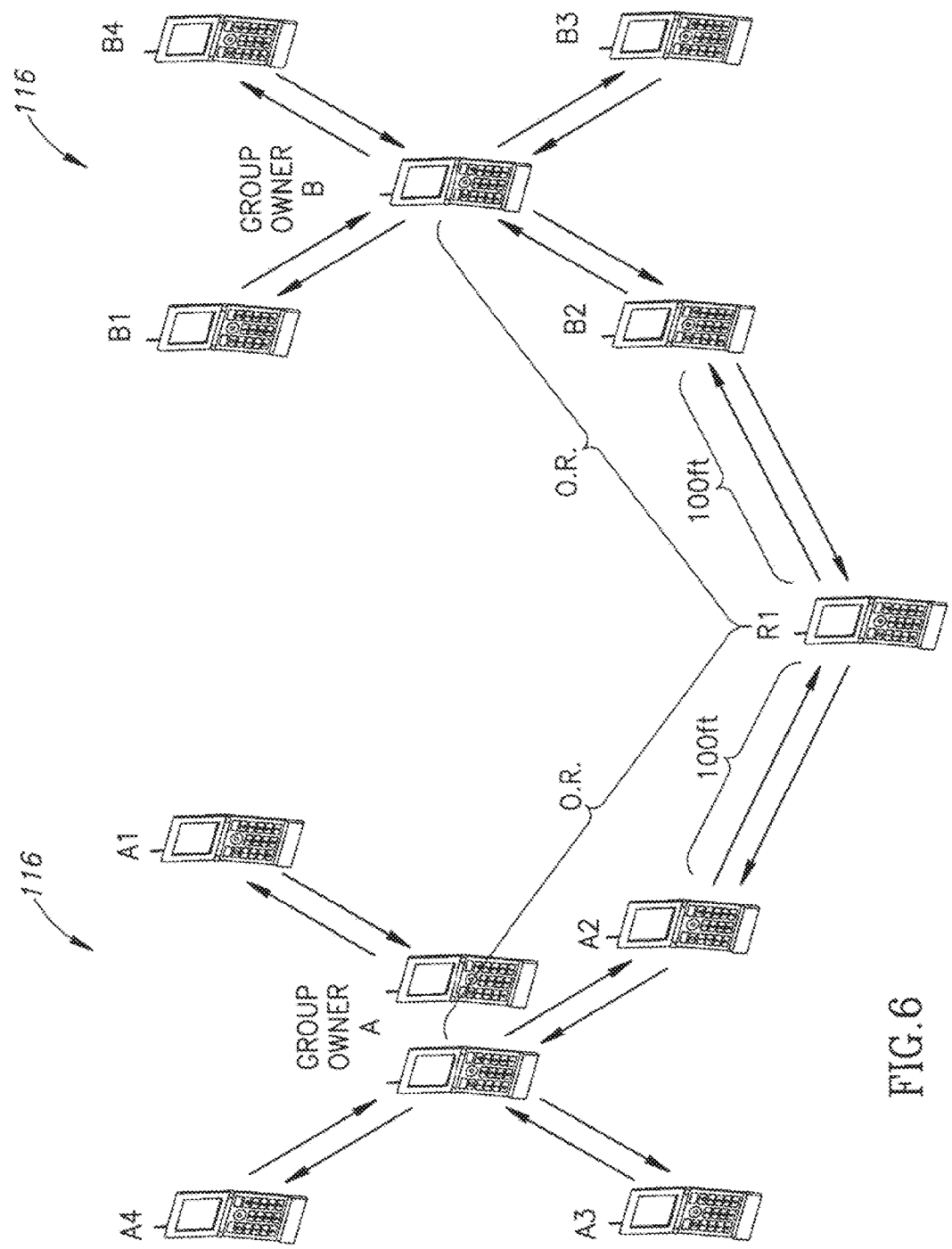
FIG. 6 illustrates the dynamic formation of short-range communication networks.

FIG. 6 illustrates other scenarios in which wireless communication devices detect hot spots or become hot spots to facilitate the formation of short-range wireless communication networks 116. In FIG. 6, there are two distinct short-range wireless communication networks 116, designated as Group A, and Group B. Group A has a Group Owner A, which serves as the hot spot and, in the example of FIG. 14, includes phones A1-A4. The wireless communication devices A1-A4 are considered peers and may communicate with each other, if in range, or communicate via the Group Owner A. Similarly, Group B includes Group Owner B and wireless communication devices B1-B4. The wireless communication devices B1-B4 are operating as peer devices and may communicate directly with each other, if in range, or communicate via the Group Owner B.

FIG. 6 illustrates the group owners (i.e., Group Owner A and Group Owner B) at the center of each respective short-range communication network 116 to illustrate the potential range of a network. However, once the peer wireless communication devices become part of a short-range communication network 116, they can freely communicate directly with other peer wireless communication devices of that network or any other short-range communication network with which they come into range. For example, the peer wireless communication devices A1 and A4 may communicate directly with each other if they move into communication range of each other.

In FIG. 6, a new wireless communication device, designated as R1, is out of range of Group Owner A and Group Owner B, but comes within range of the peer wireless communication device A2 and the peer wireless communication device B2. In accordance with the system design, the wireless communication device R1 searches for hot spots. The wireless communication device R1 cannot communicate with either the network A or network B because it is out of range (indicated by the designation O.R.) of the hot spot (i.e., Group Owner A and Group Owner B) and therefore will not detect the transmitted SSID from the group owners.

Because the wireless communication devices A2 and B2 are not hot spots, the wireless communication device R1 will be unsuccessful in locating a short-range communication network 116. In this situation, the wireless communication device R1 will become a hot spot. While the wireless communication devices A2 and B2 are peers within their respective networks, they may still periodically scan for other hot spots. When the peer wireless communication devices A2 and B2 search for other hot spots, they will detect the newly created hot spot of wireless communication device R1. As soon as the wireless communication devices A2 and B2 detect the new hot spot provided by the wireless communication device R1, the wireless communication devices R1, A2, and B2 will synchronize, as described above. The presence of the new hot spot provided by the wireless communication device R1 effectively links together both network A and network B using the wireless communication devices A2 and B2, respectively, as bridges. Thus, all of the phones in Network A and Network B are bridged together to form a larger short-range wireless communication network. The wireless communication devices in Network A and Network B, as well as the wireless communication device R1, will all be synchronized and have exchanged messages, as described above.

In the scenario of FIG. 6, network A and network B are connected together via the wireless communication device R1 with the wireless communication device R1 effectively acting as a relay between the wireless communication devices A2 and 82. However, as the wireless communication devices in the network A and the network B move around, they may come into range of each other and can therefore communicate directly with each other. For example, the peer wireless communication devices A1 and B1 in FIG. 6 may move within range of each other thus allowing direct communication between these devices.

Furthermore, those skilled in the art will appreciate that if the wireless communication device R1 came within range of only one of the peer wireless communication devices A2 and 82, the wireless communication device R1 would become a hot spot and be detected by the peer device of only one of the networks. For example, if the wireless communication device R1 became a hot spot and came within range of the wireless communication device B2, the wireless communication device B2 would act as a bridge or relay between the wireless communication device R1 and the wireless communication devices of Network B.

Figure 7:
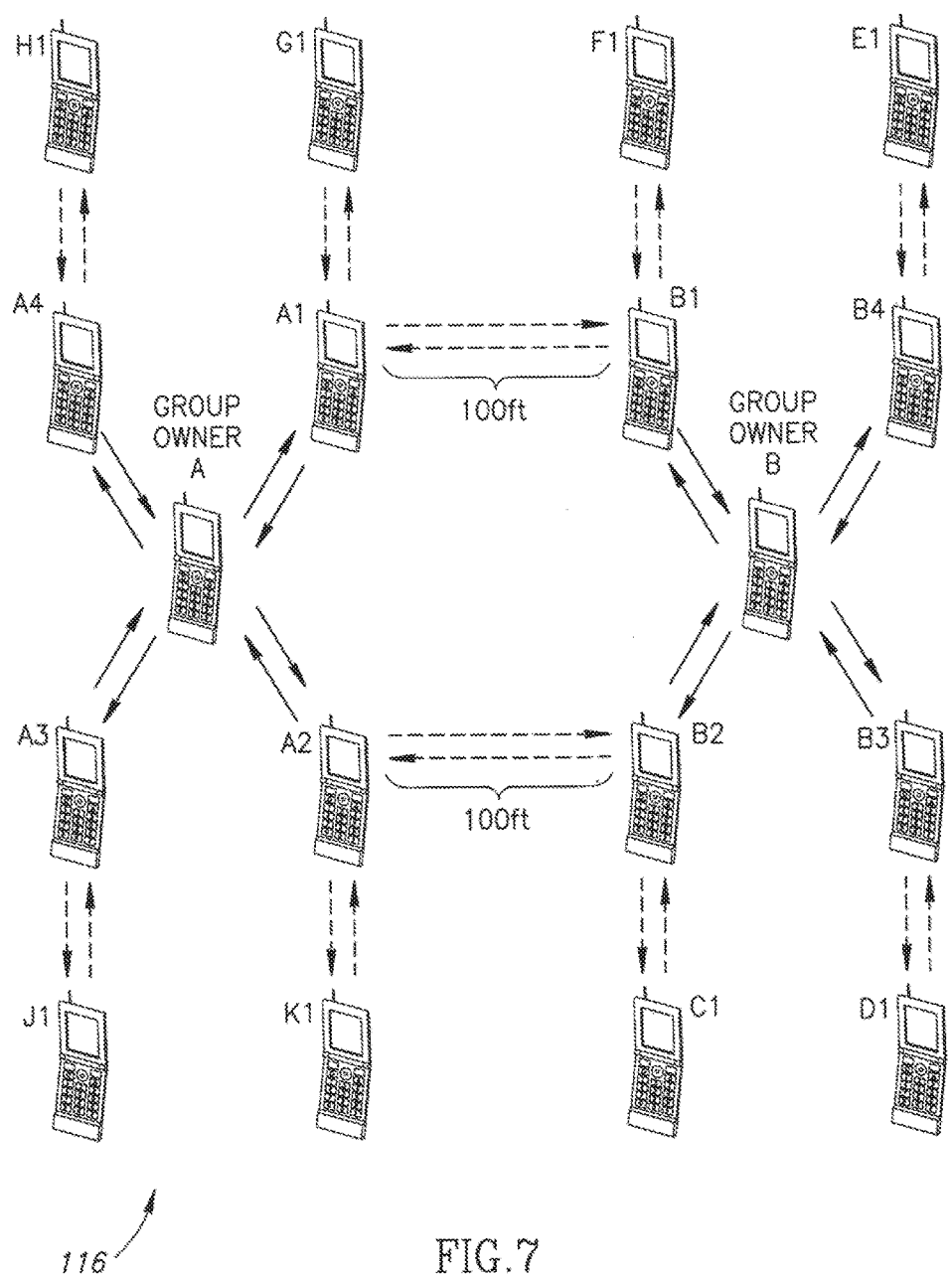
FIG. 7 illustrates further dynamic formation of short-range communication networks.

FIG. 7 illustrates a logical extension of the principles discussed with respect to FIG. 6. In the example of FIG. 7, each of the peer devices (A1-A4 of Network A and B1-B4 of Network B) searches for and connects with other hot spots (i.e., the hot spots provided by wireless communication devices C1-K1). The wireless communication devices C1-K1 may be the group owners of their respective smaller short-range wireless communication networks 116 or may be peer devices in other short-range wireless communication networks that periodically become hot spots to search for other wireless communication devices. Although not illustrated in FIG. 7, those skilled in the art will appreciate that the hot spot wireless communication devices C1-K1 may have other peer devices (not shown) connected to that hot spot thus greatly expanding the overall reach of the short-range communication network 116.

As discussed above, the wireless hot spot/group owner assigns the same MAC address to those wireless communication devices that detect the SSID beacon (e.g., SSID JUMMMP). In yet another alternative embodiment, the requirement of a group owner to initiate formation of a short-range communication network 116 can be eliminated. A program designed in accordance with the present teachings can be executed and utilize a predetermined channel SSID, IPrange, port, and MAC address associated with the JUMMMP functionality. A wireless communication device can simply broadcast a greeting message; if it is detected by another nearby wireless communication device, the other device can transmit its own messages thereby synchronizing the data storage area 184 (see FIG. 3) of each device. In this manner a completely de-centralized short-range communication network can be formed. The wireless communication devices detect the presence of other nearby devices by virtue of the fact that they respond to the transmission of the greeting message.

Thus, it can be appreciated that the wireless communication system described herein provides a highly dynamic network in which a large number of wireless communication devices may be coupled together in a dynamic fashion to create a large number of short-range communication networks 116 and to permit individual users to come and go from any particular short-range communication network.

The short-range communication networks 116 may also advantageously be used for game play by the wireless communication devices. A number of single player games are known in the art. However, the short-range communication networks 116 enable multi-player games that do not require communication between the wireless communication devices using the PLMN 102 (see FIG. 1). Traditional, multi-player games use a server to exchange data between game playing devices. In contrast, the multi-player games described herein do not require a server or even a network connection to the PLMN 102. The data can be exchanged between the wireless communication devices by direct peer-to-peer communication, such as between the wireless communication devices 122 and 124 in FIG. 3. Alternatively, the communication between the wireless communication devices engaged in game play activity may be via an intermediary communication device. For example, the access point 140 (see FIG. 3) may act as an intermediary device between the wireless communication devices 120 and 122. That is, game play data transmitted by the wireless communication device 120 may be relayed to the wireless communication device 122 by the access point 140. Similarly, the wireless access point 140 relays game play data from the wireless communication device 122 to the wireless communication device 120. Alternatively, a different wireless communication device may act as the intermediary device. For example, the wireless communication device 122 shown in FIG. 4 may act as an intermediary device between the wireless communication devices 120 and 124. In one embodiment, the wireless communication device 122 may be a participant in a multi-player game along with the wireless communication devices 122 and 124. Alternatively, the wireless communication device 122 may not be engaged in the game play activities, but merely serves as a relay of game play data between the wireless communication devices 120 and 124. In yet another alternative embodiment, both peer-to-peer and intermediary devices can be used. For example, the wireless communication devices 120-124 in FIG. 3 may all be participants in a game. The wireless communication devices 122 and 124 exchange game play data directly with each other via the communication link 136. The wireless communication device 120 participates in the game play with the wireless communication devices 122-124 by exchanging game play data via the access point 140.

When the wireless communication device, such as the wireless communication device 120 in FIG. 4 transmits a data packet to the access point 140, the access point will echo back the packet to the wireless communication device. When the wireless communication device 120 receives the echo packet, it serves as a confirmation that the packet was received by the access point 140. If the wireless communication device receives a different packet, such as a packet of game play data, the wireless communication device processes the packet, but also assumes that the transmitted packet was not received by the access point 140. In this event, the wireless communication device 120 will re-broadcast the data packet and await an echo to confirm that the data packet was received by the access point. The IP address of the wireless communication device is included in the broadcast packet; this permits the wireless communication device to verify the echo transmission.

The game play data is generated in accordance with game play rules that are specific to the game or may be generally applicable to broad classes of games. For example, the game play data generated by a multi-player game, such as Tic-Tac-Toe, may be different from the form of game play data generated by a chess game.

Various message types, such as Public Messages, Group Messages, and Direct Messages, have been described in detail above. The selection of a particular message type may depend on the particular game and/or user preferences. For example, a chess game may allow the exchange of game play data as a Public Message. This allows nonparticipants to view the progress of the game. In one embodiment, public viewers may also be able to comment on the game using a text window 500 (see FIG. 8). Alternatively, the players may elect to play a private game. In this event, game play data may be exchanged as Direct Messages that can only be read by the individual participants in the text window 500.

Figure 8:
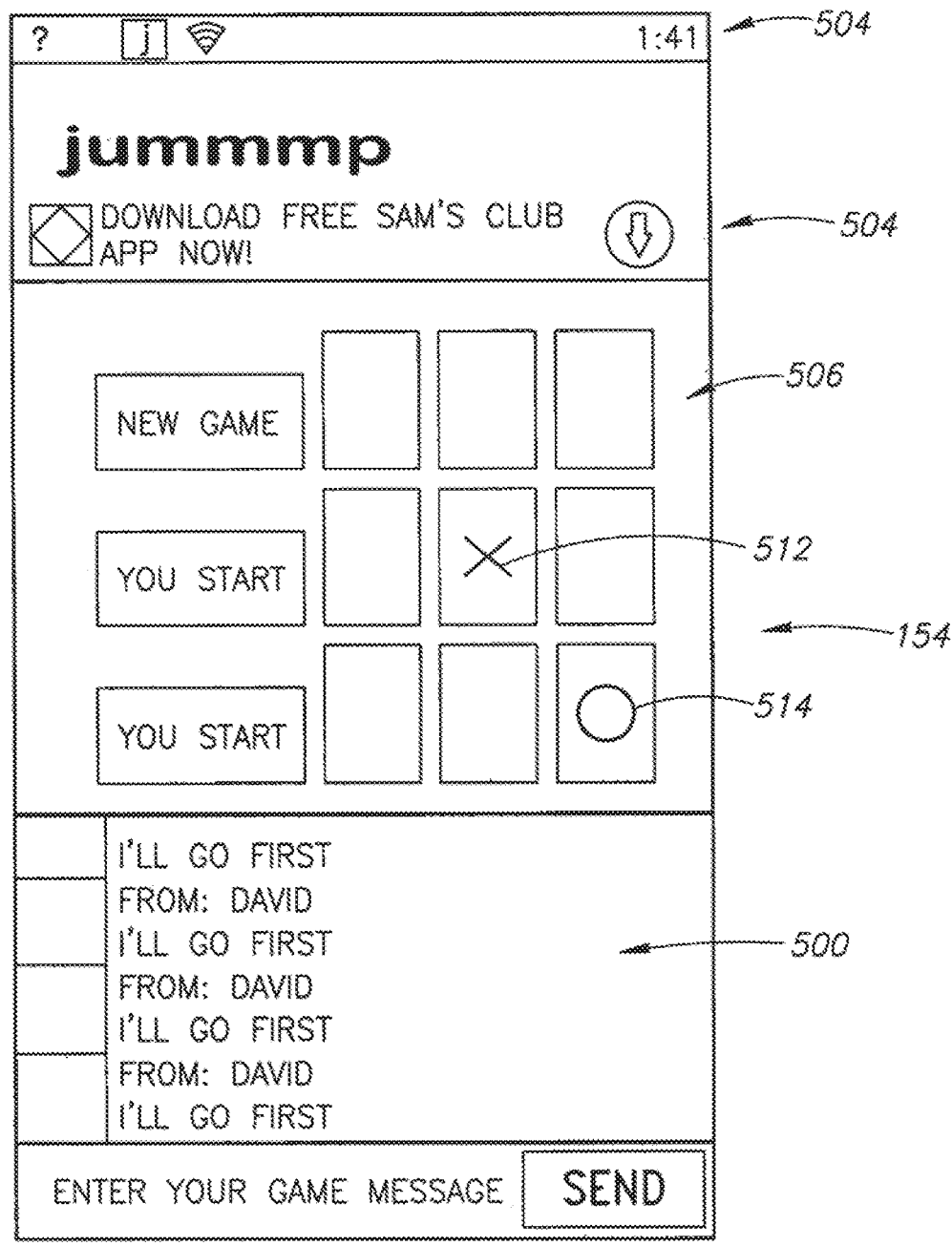
FIG. 8 illustrates a screen display of a wireless communication device engaged in a game play activity.

FIG. 8 illustrates one example of game play using the short-range communication networks 116. FIG. 8 illustrates an example embodiment of data shown on the display 154 (see FIG. 2) of the participating wireless devices, such as the wireless communication devices 120 and 122. The game shown on the display 154 is Tic-Tac-Toe and may include text messages 500 between the game participants as well as other wireless communication devices that are also in the nearby network (i.e., the short-range communication network 116) if the game and text messages are Public Messages. The display 154 also shows advertisements 502, and status information 504 for the wireless communication devices 120 and 122. In the game illustrated in FIG. 8, the display 154 shows a game play surface 506. In the case of Tic-Tac-Toe, the game play surface 506 is a cross-hatch pattern well known for use in Tic-Tac-Toe. The display may also include optional game control buttons 508. In certain game play embodiments, the entire game play surface 506 is visible to all players and is shown on the display 154 of each of the wireless communication devices 120 and 122 participating in the game play or observing the game play if the game is available to the public. In other game play embodiments, which will be described in greater detail below, only a portion of the game play surface 506 may be available for viewing on the display 154.

Returning to FIG. 8, the entire game play surface 506 is visible on the display 154 for each wireless communication device (e.g., the wireless communication devices 120 and 122). In one embodiment, the display 154 may include a cursor that is manipulated by a user of the wireless communication device using a cursor-controlled button (not shown), such as a track ball, set of directional buttons, or the like. The keyboard (not shown) on the wireless communication device may also be used in game play. However, it is common in wireless communication devices that the display 154 is a touch-sensitive display. In this embodiment, the user merely touches the display 154 in the desired location to activate a function associated with that display area.

In the example of the Tic-Tac-Toe game of FIG. 8, the user of the wireless communication device (e.g., the wireless communication device 120 in FIG. 3) may activate game play by activating the "I'll Start" game control button 508. In Tic-Tac-Toe, it is customary for the person starting the game play to use an "X" to indicate their selection while the opposing player uses an "O" to indicate their selection. Those skilled in the art will appreciate that other indicators, such as coloring the blocks of the game play surface 506 in different colors (e.g., Red and Black) to signify their selections. Other indicators may also be readily used. The game pieces for the first user, no matter what form they may take, may be generically described in FIG. 8 as a first set of game play objects 512 while the opposing player may use different game pieces, referred to as a second set of game play objects 514.

In the example of FIG. 8, the first player selects the center position by pressing the touch-sensitive display 154 in the desired location. The software program executing the game on the wireless communication device 120 will display the first set of game play objects 512 (e.g., an "X") on the display 154 of the wireless communication device 120. The software program executing the game on the wireless communication device 120 also calculates the game play data, in the form of position data for the first set of game play objects 512 on the display 154, and transmits the game play data from the first wireless communication device 120 to the second wireless communication device (e.g., the wireless communication device 122) using the short-range transceiver 176 (see FIG. 2) and, in this example, the access point 140. As noted above, use of the short-range transceiver 176 avoids any need for communication of game play data using the PLMN.

The software program executing the game on the wireless communication device 122 will display the first set of game play objects 512 (i.e., the "X") on the display 154 based on the game play data received from the wireless communication device 120. Game play continues when the second player (e.g. the wireless communication device 122) selects a position on the game play surface 506 to place the second set of game play objects 514 (e.g., an "O"). In response to the user input, the software program executing the game on the wireless communication device 122 also displays the second set of game play objects 514 based on the user input on the touch-sensitive display 154. The software program executing the game on the wireless communication device 122 also calculates game play data, in the form of position data for the second set of game play objects 514 on the display 154, and transmits the game play data from the second wireless communication device 122 to the first wireless communication device 120 using the short-range transceiver 176. Again, it should be noted that there is no need for any communication using the PLMN to exchange game play data.

The process is repeated wherein the software program executing the game on the wireless communication device 120 will display the first set of game play objects 512 based on user selections on the touch-sensitive display 154 of the wireless communication device 120 and will display the second set of game play objects 514 on the display 154 based on the game play data received from the wireless communication device 122. A similar process occurs with the software program executing on the wireless communication device 122. However, the software program executing on the wireless communication device 122 will display the first set of game play objects 512 based on the game play data received from the wireless communication device 120 rather than user selection on the touch-sensitive display. It is the second set of game play objects 514 that is displayed based on user selections on the touch-sensitive display of the wireless communication device 122. The game proceeds in the normal manner until one player has won or until there is a tie. Selection of a "New Game" game control button 508 will restart the process.

In addition to the game play data described above, the two wireless communication devices 120 and 122 can exchange text messages or other messages (e.g., audio or video messaging). The availability of social networking provides additional appeal to game play using the short-range wireless communication networks 116. As previously noted, the exchange of text or other messages between the players may be in the form of Public Messages and therefore be available for view by anyone within range of the short-range communication network 116 that includes the game play participants (e.g., the wireless communication devices 120 and 122). Alternatively, the messages may be Group Messages or Direct Messages as previously described.

The display 154 in FIG. 8 also includes advertisements 502. In an exemplary embodiment, the advertisements 502 can be provided to the wireless communication device (e.g., the wireless communication device 120) using third-party or proprietary ad delivery technology. In one embodiment, a line of code is added to the software application executing the game on the wireless communication device 120. The line of code describes the location of an advertisement and a link to a third-party ad provider, such as AdMob by Google. The ads come from a'Google AdMob server (not shown) to a delivery device, such as the access point 140, for delivery to the wireless communication device 120. There are a number of possibilities for the advertisements 502. In one embodiment, the ads can be from Google AdMob, or other ad service provider, and are under the control of AdMob or other service provider. Revenue is provided through clicks on the advertisements 502.

In another embodiment, the ads can be controlled by the owner of the software game program and under its control. The ads can be provided to AdMob and delivered to the wireless communication device in the manner described above. For this type of operation, there is generally no revenue provided by click-throughs, but it does provide promotions for the company or product being advertised.

In yet another embodiment, the advertisements 502 can be ads for a third party where the software application provider has negotiated a deal with the third party for revenue based on the number of impressions, the number of clicks, and the like. These advertisements can be provided to Google AdMob or other ad provider and an impression strategy may also be provided.

Figure 9:
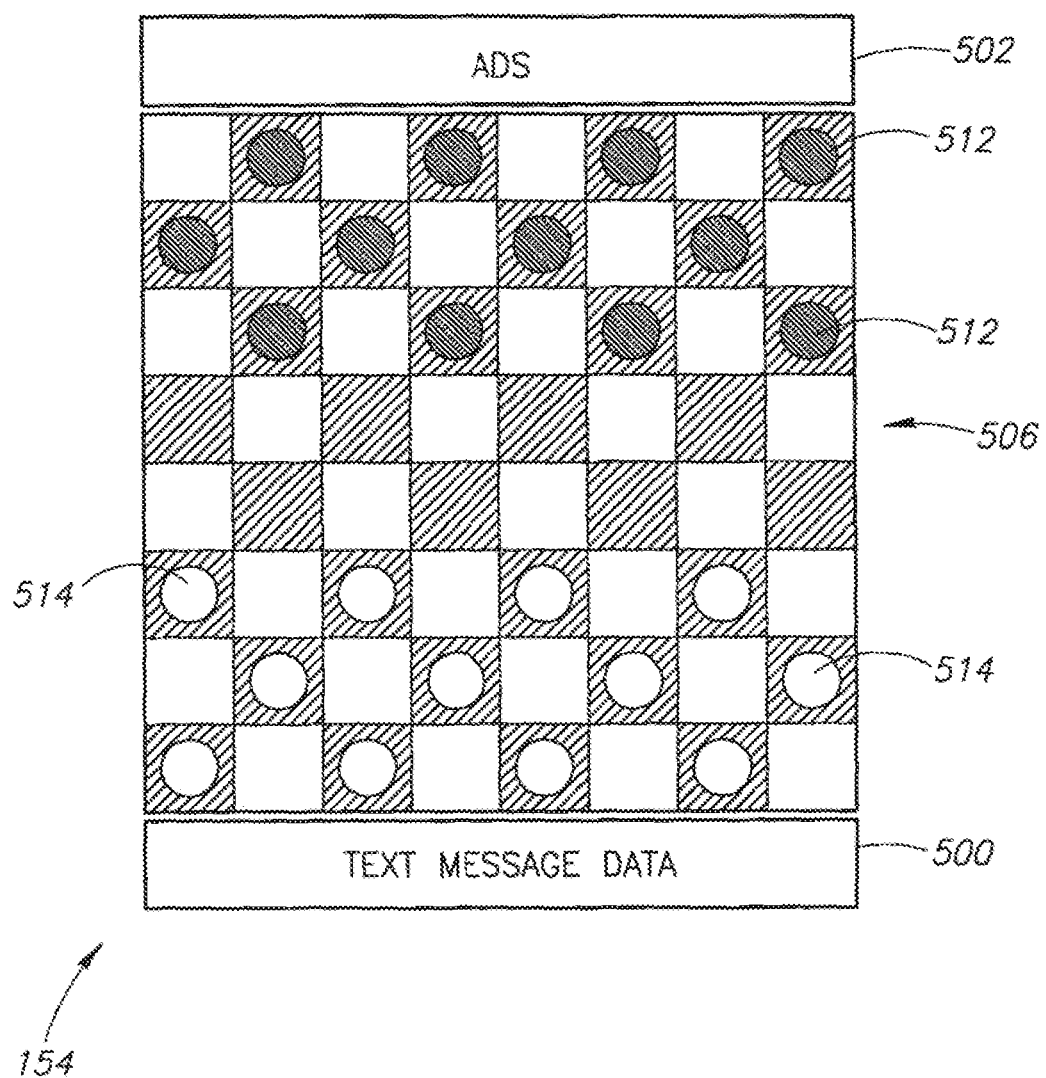
FIG. 9 is a screen display of a wireless communication device engaged in an additional game play activity.

FIG. 9 illustrates an example of the display 154 for the game of Checkers. Checkers is a two-player game and, in an exemplary embodiment, each of the wireless communication devices (e.g., the wireless communication devices 120 and 122 in FIG. 3) show the entire game play surface 506 in the form of a checkerboard. When the game is initialized, the display 154 of each of the wireless communication devices 120 and 122 will show the entire game play surface 506 as well as the first set of game play objects 512 and the second set of game play objects 514. Although illustrated in FIG. 9 as black and white checkers, those skilled in the art will appreciate that other colors, shapes, and the like may be used to represent the first and second sets of game play objects 512 and 514. As discussed with respect to the Tic-Tac-Toe game of FIG. 8, the display 154 in FIG. 9 illustrates an area for text messages 500 and for advertisements 502.

Following the initialization of the checkers game in FIG. 9, one player will move first. For example, the operator of the wireless communication device 120 manipulates the touch-sensitive display 154 to position the first set of game play objects 512. The software program executing the checkers game on the wireless communication device 120 will display the first and second sets of game play objects 512 and 514. When the player moves the first piece, one of the first set of game play objects 512 will be in a new position. The software program executing the game play on the wireless communication device 120 will display the first set of game play objects 512 with one of the pieces in a new position. The software program executing the game on the wireless communication device 120 also calculates the game play data, in the form of position data for the first set of game play objects 512 on the display 154, and transmits the game play data from the first wireless communication device 120 to the second wireless communication device 122 using the short-range transceiver 176 (see FIG. 2) and, in this example, the access point 140. Again, the game play data is transmitted between the wireless communication devices 120 and 122 using the short-range transceivers 176 as part of the short-range communication networks 116 and does not require any communication via the PLMN.

The wireless communication device 122 receives the game play data. The software program executing the checkers game on the wireless communication device 122 will display the first set of game play objects 512 on the display 154 with one of the first set of game play objects in its new position. In turn, the user of the wireless communication device 122 selects one of the second set of game play objects 514 for movement. The software program executing the game on the wireless communication device 122 moves the selected one of the second set of game play objects 514 based on user operation and transmits the game play data to the wireless communication device 120. The software program executing the game on the wireless communication device 120 receives the game play data and displays the second set of game play objects 514 based on the received game play data.

Thus, the software program executing the game on the respective wireless communication devices moves the game play objects for that user in response to user input and displays the other set of game play objects in response to received game play data. That is, the software program executing the game on the wireless communication device 120 moves the first set of game play objects 512 in response to user operation of that wireless device. The game play data resulting from movement of the first set of game play objects 512 is transmitted to the wireless communication device 122. The software program executing the game on the wireless communication device 120 also displays the movement of the second set of game play objects 514. However, the second set of game play objects 514 are moved on the display 154 of the wireless communication device 120, not in response to user operation of the touch-sensitive display 154, but as a result of game play data received from the wireless communication device 122.

Similarly, the software program executing the game on the wireless communication device 122 moves the second set of objects 514 in response to user operation of the device and moves the first set of game play objects 512 in response to game play data received from the wireless communication device 120.

Those skilled in the art will appreciate that a number of similar games are playable on the wireless communication devices utilizing the short-range communication networks 116. For example, a chess game can be played using the same game play surface 506 as required for the checkers game in FIG. 9. However, those skilled in the art will appreciate that the chess game will require a different first set of game play objects 512 and a different second set of game play objects 514. In addition, movement of the first and second sets of game play objects 512 and 514 are controlled by game rules for the game of chess rather than the game rules for the game of checkers. Other games, such as backgammon, scrabble, and other word games, and the like are also readily implemented using the short-range communication networks 116 described herein. All of the game play data for these various games is communicated between the game participants using the short-range communication networks 116 for direct peer-to-peer communication or communication via, by way of example, the access point 140.

In each of the games described above, each player can see the entire game play surface 506 on the display 154 of the respective wireless communication device. Other games may be implemented by the wireless communication devices in which only a portion of the game play surface 506 is visible on each of the wireless communication devices. In Pong, an early video game, two players played an elementary game of ping pong on a single video screen. The players could control the vertical positioning of a "paddle" to intercept the ball.

Figure 10:
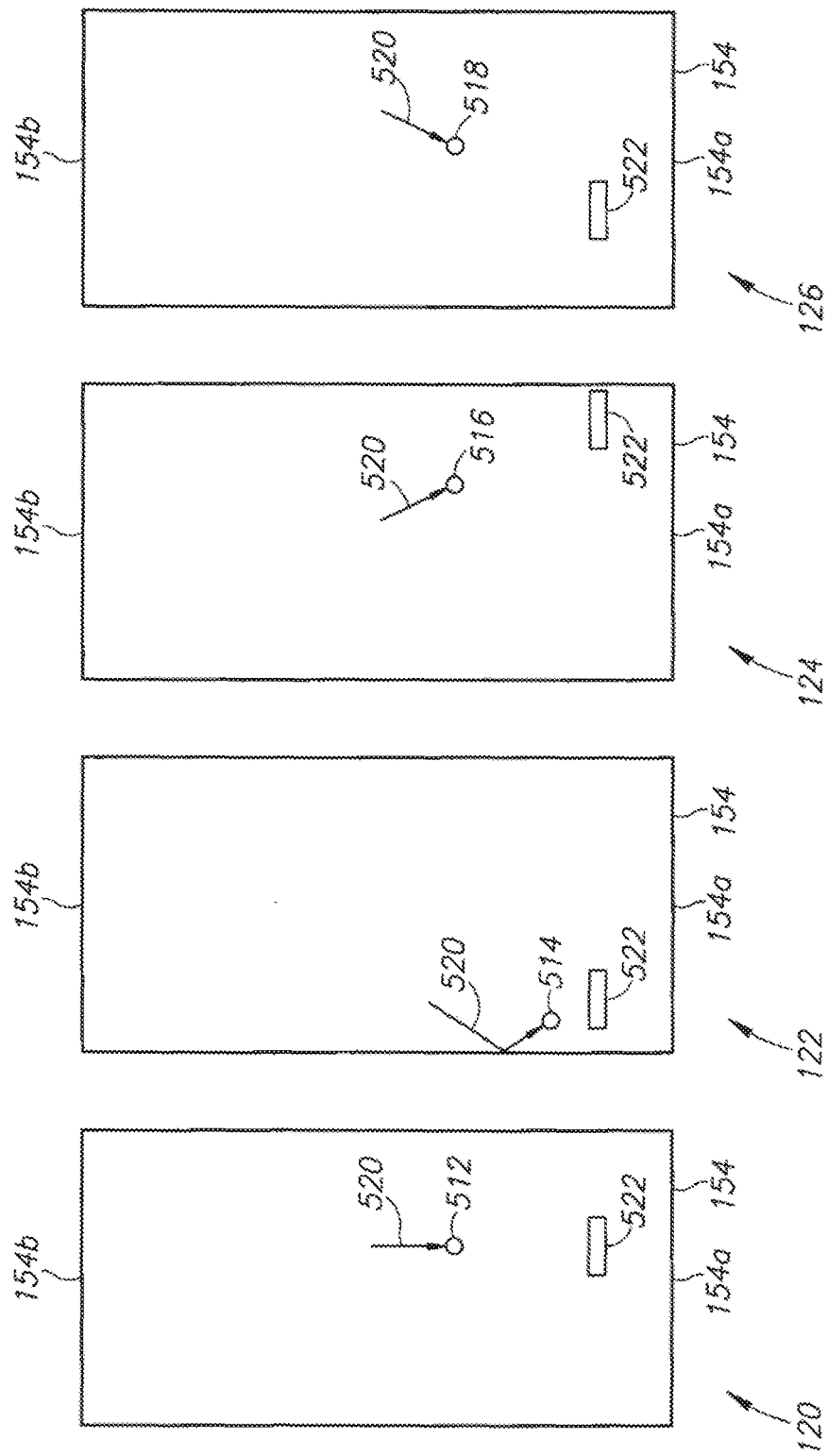
FIGS. 10 and 11 together illustrate the displays of multiple wireless communication devices engaged in a different game play activity where only a portion of the game play surface is visible on the display of each device.

In a new multi-player version, jPONG allows each player to only see a portion of the entire game play surface. If the player's paddle on one wireless communication device strikes the ball, the ball disappears off the display of that player and appears on the display of some other participant in the jPONG game play. Thus, each player only sees their portion of the game play surface. FIG. 10 illustrates an example embodiment of jPONG using four wireless communication devices 122-126 illustrated, by way of example, in FIG. 4.

For the sake of convenience, the participants in the game play illustrated in FIG. 10 are all shown as conventional wireless communication devices, such as a smart phone. However, those skilled in the art will appreciate that any network device having the short-range transceiver described above with respect to FIG. 2, can be configured for satisfactory operation as described herein. For example, the game play participants could be smart phones, PDAs, net computers, portable computing devices, iPads, and the like. The present disclosure is not limited solely to embodiments with smart phones.

In this example embodiment, the wireless communication devices 120-124 are all within range of each other and form direct peer-to-peer communication links to form the short-range wireless communication network 116e in the manner described above. In contrast, the wireless communication device 126 participates in the jPONG game play by transmitting and receiving game play data via the access point 140. Thus, game play may be conducted via one or more peer-to-peer connections using wireless communication devices and/or via one or more wireless access points (e.g., the access point 140).

As noted above, the display 154 of each respective wireless communication device 120-126 shows only a portion of the total game play surface 506 (see FIG. 8). That is, each player only sees the activity occurring on his portion of the overall game play surface 506. In the example of jPONG where there are four participating players, there will be one ball for each player for a total of four balls. The balls may be generically referred to as game play objects where game play objects 512-518 are the balls of the wireless communication devices 120-126, respectively. FIG. 10 also includes an arrow to illustrate a direction of movement 520 for each of the balls 512-518. Those skilled in the art will appreciate that the direction of movement arrows 520 do not appear in the actual game, but are merely used in the present description to illustrate the direction of movement of the balls 512-518.

Thus, instead of a single ball shared between players, the jPONG game illustrated in FIG. 10 includes one ball for each player. Although FIG. 10 illustrates an example with four players, jPONG may be satisfactorily played with as few as two players or more than four players. When the jPONG game play is initialized, the display 154 of each of the wireless communication devices 120-126 will display the respective balls 512-518. Initially, the balls 512-518 move generally in a direction towards a first end 154a of the display 154. Using the touch-sensitive display 154, the user can move a paddle 522 back and forth to intercept the ball before it reaches the first end 154a of the display 154. If the user positions the paddle 522 to intercept the respective balls 512-518, the balls begin to move generally towards a second end 154b of the display 154.

As the balls 512-518 move off the respective displays 154 at the second end 154b, the software program executing the game on each wireless communication device will calculate game play data to be transmitted to others of the wireless communication devices participating in the game. For example, the paddle 522 on the wireless communication device 120 can intercept the ball 512 and cause the ball to move in a direction towards the second end 154b of the display 154. When the ball 512 reaches the second end 154b of the display 154, the software program executing the jPONG game on the wireless communication device 120 calculates game play data associated with the ball 512. In the example of jPONG, the game play data may be in the form of position and velocity data (e.g., speed and direction) of the ball 512 as it moves off the second end 154b of the display 154.

Figure 11:
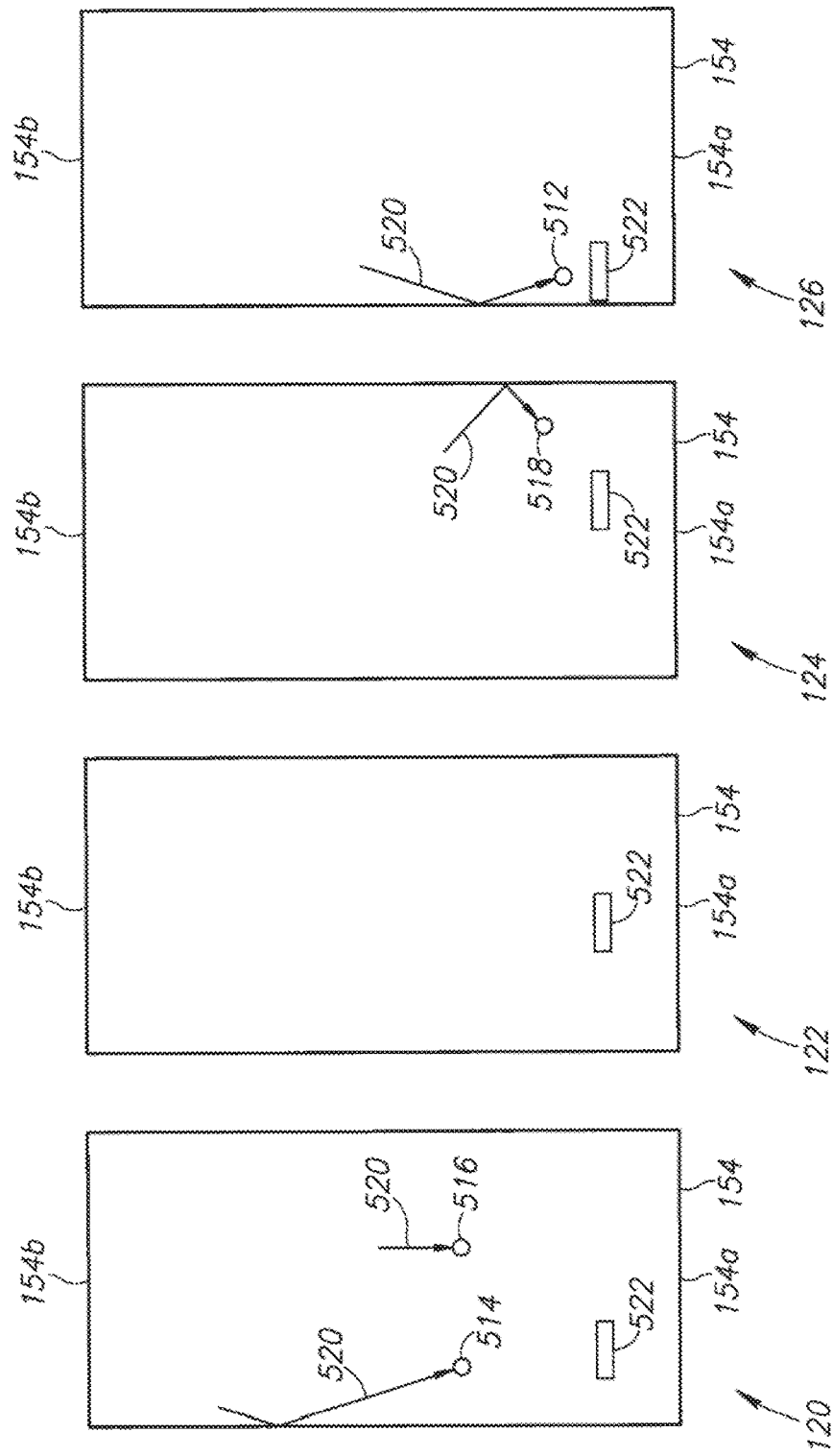

In an exemplary embodiment of jPONG, the software program executing the game play on the wireless communication device 120 will not allow the ball 512 to return immediately to the wireless communication device 120. Rather, the software program executing the TONG game on the wireless communication device 120 will select one of the other wireless communication devices (e.g., the wireless communication devices 122-126) to receive the ball 512. In one embodiment, the recipient of the game play data for the ball 512 is randomly selected. Thus, with N players, there are N balls in play. After the initial play, any of the wireless communication devices may receive game play data for up to N−1 balls. As can be appreciated, if one wireless communication device receives more than one ball, some other wireless communication device will not receive in play data for any balls. This is illustrated in FIG. 11 where the wireless communication device 120 receives game play data from the wireless communication devices 122 and 124. In response to the received game play data, the software program executing the jPONG game on the wireless communication device 120 will display the balls 514 and 516 moving toward the first end 154a of the display 154. The user of the wireless communication device 120 must move the paddle 522 to intercept both of the balls 514 and 516 on its display 154.

In contrast, the wireless communication device 122 receives no game play data and, for this round of play, has no balls to display. In turn, the wireless communication devices 124 and 126 have each received game play data for a single ball. The wireless communication device 124 received the game play data from the wireless communication device 126 while the wireless communication device 126 received game play data from the wireless communication device 120. As can be appreciated by the inclusion of the direction of movement arrows 520 the balls may be deflected off of the lateral sides of display 154 between the first and second ends 154a-154b.

The velocity of the balls and the angles with which they may bounce off the sides of the display 154 may be determined by a number of factors. In one embodiment, the velocity of the ball may increase each time it touches a paddle 522. The ball velocity starts slow and increases to add to the excitement of the game. In an exemplary embodiment, the velocity of the ball is maintained as it moves from one wireless communication device to another. For example, FIG. 9 illustrates the ball 512 moving toward the paddle 522 on the display 154 of the wireless communication device 120. If the ball 512 is successfully struck by the paddle 522, it will change direction and move toward the second end 154b of the display 154. The velocity at which the ball 512 leaves the second end of the display 154b on the wireless communication device 120 is maintained when it appears on another of the wireless communication devices participating in the game play. That is, the direction and speed of the ball 512 appear on the display 154 of the wireless communication device 126 just as if the second ends 154b of the two wireless communication device 120 and 126 were butted together.

In yet another exemplary embodiment, the paddle 522 may impart a "spin" to the ball to alter the direction of travel. In essence, the paddle 522 may put a "spin" on the ball based on factors such as the location on which the paddle and the ball intersect, movement of the paddle at the time of intersection, and the like. Those skilled in the art will appreciate that a number of variations of these parameters can be used to provide excitement in the game play.

This process continues where the users of each of the wireless communication devices 120-126 must move their respective paddles 522 to intercept all of the balls on its respective display 154. If the player misses the ball and it encounters the first end 154a, that player is eliminated from the game. The eliminated wireless communication device will send game play data to the other remaining wireless communication devices to indicate that it has been eliminated from the game. In this manner, no future balls will be directed to the eliminated wireless communication device. However, the ball originally associated with that wireless communication device will continue in play until there is a final winner. Thus, at some point in the game, there will be two wireless communication devices and four balls 512-518. The game ends when only one player remains.

Figure 12:
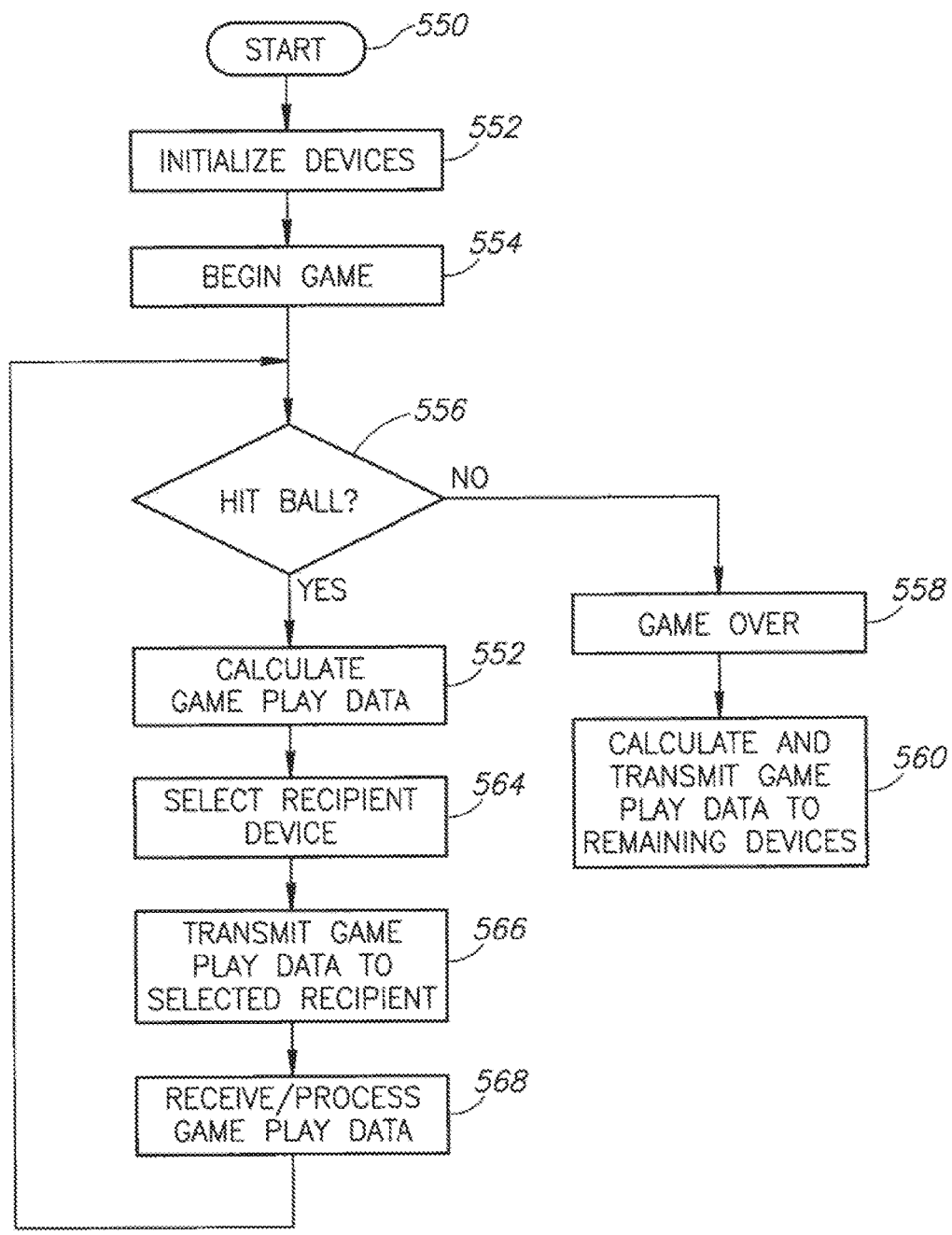
FIG. 12 is a flow chart illustrating the operation of the game play described in FIGS. 10 and 11.

FIG. 12 is a flow chart illustrating the overall operation of the jPONG game. At a start 550, a number of wireless communication devices are within range of each other and decide to play the game. The software program is initialized on each device in step 552. In the initialization process, the players may, by way of example, select a color for their ball and paddle 522. Although not necessary for satisfactory operation of the game, it adds enjoyment to be able to identify the balls from the individual players. In the initialization process, the display 154 on each of the wireless communication devices (e.g., the wireless communication devices 120-126) show the available color selections. As one player selects a particular color, that wireless communication device transmits game play data to the others of the wireless communication devices participating in the game play to indicate that color has been selected. In response to the color selection by one device, the remaining wireless communication devices will eliminate that color option from the display 154. When each player has selected a color, the game can begin automatically at step 554 or a start game control button, such as the game control buttons 508 in FIG. 8, can be selected to begin the game in step 554. As previously noted, each of the balls initially moves toward the first end 154a of the display.

In decision 556, the software program executing the jPONG game on each wireless communication device will determine whether the paddle 522 has intercepted the ball. If the paddle 522 has not intercepted the ball, the result of decision 556 is NO and, in step 558, the game is over for that player. As previously discussed, the ball continues in play. In step 560, the wireless communication device whose game play has ended performs a final calculation of game play data and transmits the game play data to the others of the wireless communication devices still participating in the game. The game play data includes the position and velocity data for the ball that has just been missed as well as an indication that the particular wireless communication device is no longer active in the game. The others of the wireless communication devices will therefore eliminate that wireless communication device as a possible destination for the game play data.

If the paddle 522 did strike the ball, the result of decision 556 is YES and the ball will begin to move toward the second end 154b of the display 154. When the ball reaches the second end 154b, that particular wireless communication device calculates game play data in step 562. In step 564, the wireless communication device selects a recipient device from the remaining wireless communication devices still playing the game. In step 566, the wireless communication device transmits the game play data to the selected recipient.

In step 568, at least some of the participating wireless communication devices will receive game play data. As previously noted, it is possible that a given wireless communication device may not receive any of the balls 512-518 or a given wireless communication device may receive game play data for all four balls 512-518. As previously discussed, one embodiment of the jPONG game is that a wireless communication device will not receive a ball that it has just struck in the previous round. However, in FIG. 11, the wireless communication device 122 did not receive any game play data for any of the balls 512-518. Thus, in the next round, it is possible that the wireless communication device 122 could receive game play data for zero balls, one ball, or up to all four of the balls 512-518.

In an alternative embodiment, this limitation could be removed such that a ball struck by the paddle 522 on one of the wireless communication devices could receive that same ball back again in the next round. In an alternative embodiment, the game could be played such that each wireless communication device receives game play data for at least one ball in each round.

In step 568, each of the remaining wireless communication devices receives and processes game play data for the balls. The process returns to decision 556 until only one player remains in the game.

Thus, the short-range communication network 116 can be used for game play using the same communication techniques described in the previously cited patents assigned to the assignee of the present disclosure.

In another aspect of multi-player game play, it may be desirable to store game play data and/or profile data for the individual players. For example, a chess game may be interrupted. The system 100 permits the game play data to be extracted from the wireless communication devices and stored on the individual JUMMMP web pages 202 (see FIG. 3) of one or more players in the game play activity. Alternatively, the game play data can be extracted from the wireless communication devices and stored on the individual social network web pages 208. In yet another alternative, the game play data may be stored on a server in a cloud computing environment. The general extraction process has been described above with respect to profile data. The same principles apply herein to game play data. The game play data can be extracted when the game is suspended or can be extracted on an ongoing basis. For example, chess players may choose to create a record of the entire game. The moves from each player are recorded using the conventional chess game play rules. In one embodiment, this form of game play data may be temporarily stored in the data storage area 184 (see FIG. 2) of each wireless communication device. At the conclusion, each player may be offered the option of saving the game play data. If the player opts to save the game play data, it is extracted from the data storage area 184 of the wireless communication device and transmitted to the individual JUMMMP web page 202 for that player or to the cloud computing environment. Each player may also have the option of extracting and saving profile data from the other players. Alternatively, the game play data can be extracted after each move or after several moves and transmitted to the individual JUMMMP web page 202 for that player. As described above with respect to profile data extraction, the game play data can be transmitted to the individual JUMMMP web page 202 (or the individual social network web page 208) or the cloud computing environment via the PLMN 102 (see FIG. 1), the access point 140 (see FIG. 3) or via one or more wireless communication devices in the short-range communication network 116 (see FIG. 4).

If the game play data was stored due to a temporary suspension of the game, the data can be recalled and downloaded to the wireless communication devices of each play using the reverse process described above. When game play data has been restored to all the wireless communication devices participating in the game, game play may resume.

In addition to game play data, user profile data may be extracted and stored. The matching of profile data has been described in detail above. However, in this aspect, the profiles of players that participate in the same game may be extracted regardless of a profile matching process. That is, it can be assumed that the players are willing to exchange profile data if they are participating in game play together. Alternatively, the system can query the user by sending a message to the wireless communication device (e.g., the wireless communication device 120) to request permission to share the profile data for the user of the wireless communication device 120. If profile exchanges are presumed or authorized, the wireless communication devices can perform in the manner described above with respect to profile exchange. In this aspect, the wireless communication device can provide profile information as well as location data to indicate the current location of each player.

Furthermore, it is possible to allow a game play participant to log onto the individual web page (e.g., the individual JUMMMP web page 202 in FIG. 3) to extract additional profile data for players played against in different games. For example, the user of the wireless communication device 120 may have user profile data for other players that have participated in chess games. If the user of the wireless communication device 120 grants access permission to the user of the wireless communication device 122, the wireless communication device 122 can extract profile data for the user of the wireless communication device 120 and, if authorized, extract profile data for any other players that have played chess against the user of the wireless communication device 120. Those skilled in the art will appreciate that this concept can be extended to other games as well. Alternatively, the user of the wireless communication device 120 can grant access to profile information for any player that has participated in any game with the user of the wireless communication device 120.

In addition to the profile information, location information may also be disclosed. In this aspect, the user of the wireless communication device 122, by way of example, can learn where the user of the wireless communication device 120 has played games against the various other game play participants. In one aspect, the location data can be displayed on a map and show icons of the other users. Each user may have an individualized icon to uniquely identify the user.

As previously discussed, the profile and location data may be stored in the individual JUMMMP web page 203 (see FIG. 3) or the individual web page 208 of a social network web site. In either embodiment, some form of data structure may be readily employed to store the extracted profile data. The extracted profile data may be stored as part of a data base, memory table, text file, spreadsheet, or the like. Those skilled in the art will appreciate that any convenient form of data structure may be employed to store the extracted profile data from game play participants.

The present disclosure provides several examples of game play activity involving multiple players. Those skilled in the art will appreciate that the same modes of communication between devices, as described herein, are applicable to many other games. Board games other than checkers, chess and backgammon may be played using the communication techniques described herein to exchange game play data and alter the displays of the respective communication devices. In addition, card games, such as hearts, poker, gin rummy, etc. may be readily implemented using the system described herein. In card games, the game play surface may be, by way of example, a green surface to simulate a card table. One player may be designated as a dealer and the game play data is in the form of information about cards being dealt, wagers, winnings and loses, points scored and the like depending on the particular card game. Game play is conducted in accordance with the game play rules for the particular game.

While the system has been described herein with respect to Wi-Fi (i.e., IEEE 802.11), other short-range communication devices, such as Zigbee, Bluetooth, or the like may be satisfactorily employed with the system 100.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for game play using a plurality of wireless communication devices in a dynamic wireless communication network, each of the plurality of wireless communication devices having a network transceiver for communication with a public land mobile network (PLMN) and a non-network transceiver for communication with other than the PLMN, the method comprising:

using the non-network transceiver in each of the plurality of wireless communication devices to automatically establish a direct communication link between each of the plurality of wireless communication devices, each wireless communication device using the non-network transceiver so that communication with a public land mobile network (PLMN) is not used for game play;

using a processor in each of the plurality of wireless communication devices to initialize a selected game;

the processor in each of the plurality of wireless communication devices causing a display in each of the plurality of wireless communication devices to display an object on the display of each of the plurality of wireless communication devices and controlling movement of the object on the respective displays of the plurality of wireless communication devices;

the processor in each of the plurality of wireless communication devices calculating game play data related to movement of the object on the respective displays of the plurality of wireless communication devices;

the non-network transceiver in each of the plurality of wireless communication devices transmitting the game play data to a selected one of the plurality of wireless communication devices other than itself;

the display on each of the selected ones of the plurality of wireless communication devices that receive the game play data, displaying an object on the respective display based on the received game play data; and continuing game play wherein each of the plurality of wireless communication devices can only control movement of the object on its own display based on the received game play data.

2. The method of claim 1, further comprising saving game play data on a data storage device remote from any of the plurality of wireless communications devices.

3. The method of claim 2 wherein saving the game play data in a remote location comprises saving the game play data using the PLMN.

4. The method of claim 1, further comprising a selected one of the plurality of wireless communication devices transmitting at least a portion of the game play data to a web page associated with a user of the selected one of the plurality of wireless communication devices.

5. The method of claim 4 wherein transmitting at least a portion of the game play data to a web page associated with a user of the selected one of the plurality of wireless communication devices comprises transmitting the portion of the game play data using the PLMN.

6. The method of claim 1, further comprising saving game result data on a data storage device remote from any of the plurality of wireless communications devices.

7. The method of claim 6 wherein saving the game result data in a remote location comprises saving the game result data using the PLMN.

8. The method of claim 1, further comprising a selected one of the plurality of wireless communication devices transmitting at least a portion of the game result data to a web page associated with a user of the selected one of the plurality of wireless communication devices.

9. The method of claim 8 wherein transmitting at least a portion of the game result data to a web page associated with a user of the selected one of the plurality of wireless communication devices comprises transmitting the portion of the game result data using the PLMN.

10. The method of claim 1 wherein a first of the plurality of wireless communication devices contains profile data related to a user of the first of the plurality of wireless communication devices, the method further comprising a second of the plurality of wireless communication devices extracting the profile data from the first of the plurality of wireless communication devices and transmitting the extracted profile data to a web page associated with a user of the second of the plurality of wireless communication devices.

11. The method of claim 1, further comprising transmitting game play data for the object to the selected one of the remaining plurality of the wireless communication devices using the non-network transceiver in the wireless communication device transmitting game play data transmitting the game play data for the object to an intermediate wireless device that relays the game play data for the object to the non-network transceiver in the selected one of the remaining plurality of the wireless communication devices.

12. The method of claim 11 wherein the intermediate wireless device is another wireless communication device that is not one of the plurality of the wireless communication devices.

13. The method of claim 11 wherein the intermediate wireless device is another wireless communication device that is one of the plurality of the wireless communication devices.

14. The method of claim 11 wherein the intermediate wireless device is a wireless access point having a communication link with the first of the plurality of the wireless communication devices and a communication link with the selected one of the remaining plurality of the wireless communication devices.

15. A communication system using a remote data storage location, comprising:
- a plurality of wireless communication devices each having:
  - a first transceiver configured to communicate with a public land mobile network (PLMN);
  - a second transceiver configured to communicate other than with the PLMN;
  - a processor configured to control operation of the wireless communication device;
  - a data storage area configured to store instructions that, when executed by the processor, cause the wireless communication device to play a game;
  - a display configured to display a game play surface and to display a game play object; and
  - a user-operable input device configured to control movement of the game play object on the display;
- wherein the second transceiver in a first of the plurality of wireless communication devices is configured to transmit game play data to a second of the plurality of wireless communication devices using the second transceiver so that communication with a public mobile land network (PLMN) is not used to exchange game play data;
- the processor in the second of the plurality of wireless communication devices being configured to control operation of the wireless communication device in the game play and to display an object on the display based on the game play data received from the first of the plurality of wireless communication devices.

16. The system of claim 15 wherein the display of each of the first and second wireless communication devices are each configured to display the entire game play surface.

17. The system of claim 15 wherein the display of each of the first and second wireless communication devices are each configured to display only a portion of the game play surface and no display is configured to display the entire game play surface.

18. The system of claim 15 wherein the processor in at least one of the plurality of wireless communication devices is configured to communicate with a remote data storage location to store game play data in the remote data storage location.

19. The system of claim 18 wherein processor in at least one of the plurality of wireless communication devices is configured to communicate with the remote data storage location to store game play data using the first transceiver to communicate with remote data storage location using the PLMN.

20. The system of claim 15 wherein the processor in at least one of the plurality of wireless communication devices is configured to communicate with a remote data storage location to store game results data in the remote data storage location.

21. The system of claim 20 wherein processor in at least one of the plurality of wireless communication devices is configured to communicate with the remote data storage location to store game result data using the first transceiver to communicate with remote data storage location using the PLMN.

* * * * *